US012569814B2

(12) United States Patent
Qiao et al.

(10) Patent No.:  US 12,569,814 B2
(45) Date of Patent:     Mar. 10, 2026

(54) SUPER-WET SURFACE AND PREPARATION METHOD THEREFOR AND APPLICATION THEREOF

(71) Applicants:CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Jinliang Qiao, Beijing (CN); Songhe Wang, Beijing (CN); Xiaohong Zhang, Beijing (CN); Guicun Qi, Beijing (CN); Zhihai Song, Beijing (CN); Chuanlun Cai, Beijing (CN); Xiang Wang, Beijing (CN); Jinmei Lai, Beijing (CN); Binghai Li, Beijing (CN); Haibin Jiang, Beijing (CN); Yue Ru, Beijing (CN); Jiangru Zhang, Beijing (CN); Jianming Gao, Beijing (CN); Hongbin Zhang, Beijing (CN); Peng Han, Beijing (CN); Chao Jiang, Beijing (CN); Zhaoyan Guo, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 958 days.

(21) Appl. No.: 17/753,209

(22) PCT Filed: Aug. 4, 2020

(86) PCT No.: PCT/CN2020/106910
§ 371 (c)(1),
(2) Date: Feb. 23, 2022

(87) PCT Pub. No.: WO2021/036716
PCT Pub. Date: Mar. 4, 2021

(65) Prior Publication Data
US 2022/0282054 A1      Sep. 8, 2022

(30) Foreign Application Priority Data

Aug. 23, 2019   (CN) .......................... 201910786213.4
Aug. 23, 2019   (CN) .......................... 201910786287.8

(51) Int. Cl.
*C09D 123/36*      (2006.01)
*B01D 17/02*       (2006.01)
*B01D 67/00*       (2006.01)
*B01D 69/02*       (2006.01)
*B01D 71/26*       (2006.01)
(Continued)

(52) U.S. Cl.
CPC ....... *B01D 67/00931* (2022.08); *B01D 17/02* (2013.01); *B01D 67/0006* (2013.01); *B01D 69/02* (2013.01); *B01D 71/262* (2022.08); *C02F 1/40* (2013.01); *C02F 1/44* (2013.01); *C08J 7/18* (2013.01); *B01D 2323/02* (2013.01); *B01D 2323/385* (2013.01); *B01D 2325/02* (2013.01); *B01D 2325/36* (2013.01); *C02F 2101/32* (2013.01); *C08J 2323/12* (2013.01)

(58) Field of Classification Search
CPC ............ B01D 67/009; B01D 67/00931; B01D 71/262; B01D 2323/02; B01D 2323/38; B01D 2323/385; C08J 7/18; C08J 2323/12
See application file for complete search history.

(56) References Cited

U.S. PATENT DOCUMENTS

| | | | |
|---|---|---|---|
| 5,932,299 A | 8/1999 | Katoot | |
| 6,107,429 A * | 8/2000 | Sojka | .................. C08F 222/102 |
| | | | 428/407 |

(Continued)

FOREIGN PATENT DOCUMENTS

| | | | | |
|---|---|---|---|---|
| CA | 2889894 A1 * | 6/2014 | .......... | B29C 39/026 |
| CN | 1171412 A | 1/1998 | | |

(Continued)

OTHER PUBLICATIONS

Translation Copy of CN 1693377 A (Year: 2005).*

(Continued)

*Primary Examiner* — Hoa (Holly) Le
(74) *Attorney, Agent, or Firm* — NKL Law; Allen Xue

(57)           ABSTRACT

A super-wet surface is a polypropylene surface, on which a hydrophilic side group is grafted, having a micro-nano structure. The super-wet surface is at least super-hydrophilic and does not contain an initiator residue. The super-wet surface is prepared by grafting, in the absence of an initiator, by means of microwave irradiation, a monomer for forming a side group, on the polypropylene surface, as a grafting base, having a micro-nano structure. In the preparation of the super-wet surface, the molecular weight of polypropylene does not decrease after grafting, there is no residual monomer or initiator residue, and the super-wetting effect of the obtained surface is lasting and stable. The super-wet surface can be used in bonding, spraying, oil-water separation, water treatment, biology, medicine and energy fields.

30 Claims, No Drawings

(51) Int. Cl.
  *C02F 1/40*          (2023.01)
  *C02F 1/44*          (2023.01)
  *C08J 7/18*          (2006.01)
  *C02F 101/32*        (2006.01)

(56)          References Cited

U.S. PATENT DOCUMENTS

| | | |
|---|---|---|
| 2003/0130462 A1 | 7/2003 | Ulbricht et al. |
| 2008/0004390 A1 | 1/2008 | Aoshima et al. |
| 2014/0329061 A1 | 11/2014 | Lu et al. |

FOREIGN PATENT DOCUMENTS

| | | | | |
|---|---|---|---|---|
| CN | 1539550 A | | 10/2004 | |
| CN | 1649957 A | | 8/2005 | |
| CN | 1693377 A | * | 11/2005 | |
| CN | 1817427 A | | 8/2006 | |
| CN | 1919429 A | | 2/2007 | |
| CN | 101121100 A | | 2/2008 | |
| CN | 101492546 A | | 7/2009 | |
| CN | 101519477 A | | 9/2009 | |
| CN | 101792553 A | | 8/2010 | |
| CN | 102649029 A | | 8/2012 | |
| CN | 103183781 A | | 7/2013 | |
| CN | 103304741 A | | 9/2013 | |
| CN | 103768958 A | | 5/2014 | |
| CN | 103945924 A | | 7/2014 | |
| CN | 104941465 A | | 9/2015 | |
| CN | 105195031 A | | 12/2015 | |
| CN | 105727753 A | | 7/2016 | |
| CN | 105727769 A | | 7/2016 | |
| CN | 105749770 A | | 7/2016 | |
| CN | 106422820 A | | 2/2017 | |
| CN | 106496424 A | | 3/2017 | |
| CN | 107174972 A | | 9/2017 | |
| CN | 107349797 A | | 11/2017 | |
| CN | 107353723 A | * | 11/2017 | ......... B01D 67/0079 |
| CN | 107998908 A | | 5/2018 | |
| CN | 109518249 A | | 3/2019 | |
| CN | 109621734 A | | 4/2019 | |
| EP | 1244516 B1 | | 5/2003 | |
| EP | 3127599 A1 | | 2/2017 | |
| JP | H07024066 A | | 1/1995 | |
| JP | 4153581 B2 | * | 9/2008 | ......... C08F 222/102 |
| WO | 9924174 A1 | | 5/1999 | |

OTHER PUBLICATIONS

Translation Copy of CN-107353723-A (Year: 2017).*

Translation Copy of JPH-0724066A (Year: 1995).*

Wang, Songhe et al., "Polymer Solid-Phase Grafting at Temperature Higher than the Polymer Melting Point through Selective Heating", Macromolecules, vol. 52, No. 9, Aug. 8, 2019, ISSN:0024-9297; pp. 3222-3230, Abstract.

Jincui Gu et al., "Janus Polymer/Carbon Nanotube Hybrid Membranes for Oil/Water Separation", ACS Applied Materials Interfaces, vol. 6, Issue No. 18, pp. 16204-16209, (2014).

Gancarz, Irena et al.: "Microwave plasma-initiated Grafting of Acrylic Acid on Celgard 2500 Membrane to Prepare Alkaline Battery Separators-Characteristics of Process and Product"; Journal of Applied Polymer Science, vol. 116; Jan. 1, 2009; pp. 868-875 ; ISSN.: 0021-8995.

Tyan, Yu-Chang et al.; "The study of the sterilization effect of gamma ray irradiation of immobilized collagen polypropylene nonwoven fabric surfaces"; Journal of Biomedical Materials Research, vol. 67A, No. 3; Dec. 1, 2003; pp. 1033-1043; ISSN.: 0021-9304.

Wang, Yun et al.; "Integration of RAFT polymerization and click chemistry to fabricate PAMPS modified macroporous polypropylene membrane for protein fouling mitigation"; Journal of Colloid and Interface Science, Academic Press, Inc, US, vol. 435, Aug. 23, 2014; pp. 43-50; ISSN: 0021-9797.

"JP application No. 2022512344, First Office Action, (Non-official translation) Notification of Reasons for refusal", Japan Patent Office; Mar. 5, 2024; pp. 1-3.

Kobayashi, Motoyasu et al., "Direct Modification of Polyolefin Films by Surface-Initiated Polymerization of a Phosphobetaine Monomer", Polymer Chemistry, vol. 4, No. 3, Oct. 4, 2012, ISSN:1759-9954, pp. 731-739.

Wang et al., "Polymer Solid-Phase Grafting at Temperature Higher than the Polymer Melting Point through Selective Heating", Macromolecules, vol. 52, No. 9, Apr. 18, 2019, ISSN:0024-9297; pp. 3222, Abstract.

Wang et al.; "Light-induced amphiphilic surfaces", Nature, 1997, vol. 388 (6641), Jul. 31, 1997; pp. 431-432.

Kou, Rui-Qiang et al., "Surface Modification of Microporous Polypropylene Membranes by Plasma-Induced Graft Polymerization of α-Allyl Glucoside", Langmuir, vol. 19, No. 17, Jul. 8, 2003, pp. 6869-6875.

* cited by examiner

SUPER-WET SURFACE AND PREPARATION METHOD THEREFOR AND APPLICATION THEREOF

TECHNICAL FIELD

The present invention relates to the field of polymer materials, in particular to the field of polymer membrane materials, and specifically to a superwetting surface and a preparation method therefor and applications thereof.

BACKGROUND ART

The wettability of the surface of a solid material is usually determined by the chemical properties and microstructure of the solid surface. Polymer surfaces with superwetting property find important uses in liquid separation, self-cleaning, anti-fogging, liquid transport, functional polymer films, printing and bonding, etc.

At present, many scholars have conducted in-depth research on the surface modification of polymers, but the research on superwetting materials mostly obtains super-hydrophobic materials. There are very few reports on super-hydrophilic materials. Obviously, super-hydrophilic polymers are more difficult to prepare. The polymer surfaces obtained by traditional grafting methods, such as ATRP, corona, plasma treatment, ultraviolet light, etc. can only be hydrophilic surfaces but not super-hydrophilic surfaces.

Super-amphiphilic surfaces are more difficult to prepare than super-hydrophilic and super-lipophilic surfaces, which super-amphiphilic surfaces require that both water and oil could infiltrate the surface of the material. In 1997, Wang first reported the amphiphilic material (Wang, R.; Hashimoto, K.; Fujishima, A.; Chikuni, M.; Kojima, E.; Kitamura, A.; Shimohigoshi, M.; Watanabe, T., Light-induced amphiphilic surfaces, Nature 1997, 388(6641), 431-432), wherein an amphiphilic surface was prepared on a solid substrate by inducing titania using ultraviolet light, which surface had antifouling ability. After that, a variety of superwetting polymer surfaces were prepared using layer-by-layer assembly, electrospinning, etching, plasma treatment, dip coating, phase separation and template methods. However, the superwetting polymer surfaces prepared by the above methods must be compounded with inorganic particles, and the brittleness of solid particles in flexible articles limits the application of the materials. Therefore, so far, it is still impossible for the existing methods to prepare a super-amphiphilic polymer surface without the use of inorganic particles.

As an emerging highly efficient separation technology, membrane technology is an industrialized highly efficient and energy-saving separation method, and it has developed rapidly in recent years. In the application of membrane technology, the membrane material is the foundation and core of the development and application of membrane technology. The properties of the membrane material directly affect the separation performance of the membrane, thus the preparation process of the membrane material has always been a hot spot for scholars. Currently, widely-used membrane materials include the two kinds, polymers and inorganic materials. Among them, methods for the preparation of polymer microporous membranes mainly include phase inversion method, stretching method, leaching method, sintering method, nuclear track method and the like. In the early 1980s, Castro filed a patent application, wherein a thermally-induced phase separation (abbreviated as TIPS) method was proposed, which belongs to the thermogel phase inversion membrane production method. A polymer and a diluent that could only be miscible at higher temperatures were first heated to melt, and then the solution was cast or extruded into a film, which was then cooled. When the temperature of the solution drops below a certain temperature, polymer chains in the solution interacted to form a gel structure, and finally fine pores were formed due to phase separation; the separated gel was immersed in an extracting liquid to remove the diluent, thereby a porous membrane could be formed. Polypropylene has such characteristics as high melting point, low density, high strength, etc., and has such advantages as excellent corrosion resistance, chemical stability, heat resistance, etc., and thus is quite advantageous as a starting material for preparing membrane materials. Since polypropylene does not contain polar groups on the surface, its surface energy is very low; and its critical surface tension is only 31 to $34 \times 10^{-5}$ N/cm, and thus it is lipophilic. When polypropylene is prepared into a microporous membrane, it will exhibit stronger lipophilicity, so that it requires a higher pressure for water permeation, to thereby result in a high power consumption and a low membrane flux. In use, the hydrophobicity of the membrane readily causes the adsorption of organic matters and colloids on the membrane surface and in the membrane pores, for example, protein adsorption, thereby causing membrane fouling. In order for the membrane separation process to proceed normally, it is necessary to increase the pressure or perform frequent cleaning, which increases the operation energy consumption and cleaning costs and limits the further extensive application of polypropylene microporous membranes. Hydrophilic modification of such membranes is an important method to improve membrane water flux and pollution resistance, so it also has become one of the current hot spots of membrane research. In addition, although polypropylene is lipophilic, its lipophilicity is still insufficient. For example, in polypropylene syringe, it is still necessary to add silicone oil to increase its lipophilicity. Lipophilic separation membranes also have application prospects in fields such as gas separation. Nevertheless, polypropylene porous membranes with amphiphilic function are rarely reported.

At present, methods for the modification of membrane materials are mainly divided into physical methods and chemical methods. Physical methods include surfactant modification, surface coating modification, blending modification of membrane materials and the like. Chemical methods include plasma modification, ultraviolet radiation grafting, high-energy radiation grafting, introduction of polar groups through other chemical reactions, and the like. For example, Chinese patent application publication CN105195031A discloses a method for the hydrophilic modification of separation membranes, comprising mixing a hydrophilic prepolymer and an initiator with a membrane-forming polymer, and then performing cross-linking by ultraviolet radiation; and the hydrophilic modification method in the Chinese patent CN1299810C (published as CN1539550A) involves pre-coating monomers on the surface of the polypropylene separation membrane and performing grafting using plasma irradiation. The above methods use complicated equipments, and can hardly achieve uniform effects for the treatment of porous membranes, and thus they are not conducive to industrial applications.

Among these polypropylene film modification methods, blending modification is a commonly-used method. The blending modification method is simple and easy to control, can retain the respective characteristics of multiple polymers at the same time, and achieves obvious modification effect. In blending modification, water-soluble polymers and nanomaterials are two commonly-used additives. Water-soluble polymers such as polyvinylpyrrolidone and polyethylene glycol can significantly increase membrane flux, but the membrane has poor pressure resistance. Chinese patent application publication CN103768958A provides a method for blending a hydrophilic polymer with a polyolefin molecular membrane, wherein a polyolefin is melt-blended with a compatibilizer and a hydrophilic polymer, and then thermally-induced phase separation is performed to prepare a hydrophilic porous membrane. The membrane prepared by nanomaterials has high flux and good pressure resistance, but it is difficult for the nanoparticles to be uniformly distributed in the membrane-forming liquid, which leads to the cumbersome membrane-making process and unsuitability for industrial production. Chinese patent application publication CN104548950A adds inorganic nanoparticles treated with a coupling agent and a diluent to a polypropylene resin for melt blending, and adopts a thermally-induced phase separation method to prepare an inorganic nanoparticle-enhanced polypropylene hollow fiber separation membrane. Plasma modification, UV irradiation grafting and other modification methods have serious hydrophilicity attenuation with the increase of running time; or require more complicated chemical reactions, which makes it difficult to be industrialized.

DISCLOSURE OF THE INVENTION

In view of the prior art, the object of the present invention is to provide a novel superwetting surface, which is at least super-hydrophilic, has durable and stable superwetting property and does not have the disadvantages of the hydrophilic and/or lipophilic surfaces in the prior art.

Another object of the present invention is to provide a method for preparing such a superwetting surface, by which method the superwetting surface can be prepared simply and which method can be easily industrialized.

The objects are achieved by the superwetting polypropylene surface and the preparation method therefor according to the present invention.

According to the present invention, it is unexpectedly found out that by the grafting reaction of a polypropylene surface having a micro-nano structure with hydrophilic monomers such as organic acids and organic acid derivatives, vinyl silanes, etc., under microwave irradiation, without the addition of an initiator, and optionally by further salinization, a super-hydrophilic surface can be obtained; further grafting with lipophilic monomers such as vinyl silicone oil and styrene, etc., can be also performed, thereby further improving the lipophilicity of the super-hydrophilic surface, or even achieving super-amphiphilic surface.

Therefore, according to a first aspect of the present invention, the present invention provides a superwetting surface, which is a polypropylene surface having a micro-nano structure and grafted with a hydrophilic side group, wherein the superwetting surface is at least super-hydrophilic and the superwetting surface does not contain an initiator residue.

The term "surface" as used herein refers to the interface between a solid and air.

The surface according to the present invention is a superwetting surface. The term "superwetting" as used herein refers to super-hydrophilic, super-lipophilic or super-amphiphilic (both super-hydrophilic and super-lipophilic) properties. The term "super-hydrophilic" as used herein means that the water contact angle of the surface is less than or equal to 10°, preferably less than or equal to 5°, more preferably less than or equal to 1°, and most preferably down to about 0°, and in particular the above angle is reached within about 0.5 s. The term "super-lipophilic" as used herein means that the oil contact angle of the surface is less than or equal to 10°, preferably less than or equal to 5°, more preferably less than or equal to 1°, and most preferably down to about 0°, and in particular the above angle is reached within about 0.5 s. The contact angle is measured with a contact angle tester in a dynamic contact angle measurement mode using water droplets or oil droplets (for example, droplets of white oil or peanut oil).

The water contact angle of the superwetting surface according to the present invention can reach less than or equal to 10°, preferably less than or equal to 8°, more preferably less than or equal to 5°, even more preferably less than or equal to 1°, and most preferably about 0°, and in particular the above angle is reached within about 0.5 s.

The superwetting surface of the present invention can be attached to a substrate, or it can be a self-supporting, independent product.

Since the superwetting surface of the present invention is prepared by a grafting reaction under microwave irradiation without the addition of an initiator, the superwetting surface of the present invention does not contain an initiator residue. The term "initiator" as used herein refers to a substance commonly used in the art to initiate polymerization reaction (including grafting reaction) of monomers, such as free radical initiators, including peroxide initiators, such as organic peroxide initiators (e.g., dicumyl peroxide) and inorganic peroxide initiators; and azo initiators and redox initiators, etc.; as well as photoinitiators (or photosensitizers), e.g., benzophenone.

The superwetting surface according to the present invention is a polypropylene surface having a micro-nano structure and grafted with a hydrophilic side group. As used herein, the term "micro-nano structure" refers to a functional structure with micron or nano-scale feature size and arranged in a specific manner. The functional structure includes pore-like structures or structures having other shapes; usually, the feature size of the micro-nano structure is in the range of from 1 nm to 100 μm. The feature size refers to the average size of the feature structure of the micro-nano structure.

The polypropylene surface having a micro-nano structure as the grafting base can be various polypropylene surfaces having a micro-nano structure, and can be prepared by the existing preparation method in the prior art. The feature size of the micro-nano structure of the polypropylene surface is from 1 nm to 100 μm. For example, various polypropylene microporous surfaces can be used, preferably a polypropylene microporous plane prepared by thermally-induced phase separation process. The existing technologies of photolithography, femtosecond laser processing technology, plasma etching technology, electrospinning method, nano-imprinting, nano-casting and ultra-precision micro-milling technology, etc., can also be used to achieve the processing of the micro-nano structure of the polypropylene surface. Specifically, for example, a metal mold having a micro-nano structure on the surface is used to press out the micro-nano structure on the polypropylene surface. Alternatively, electric arc and other manners are used to prepare a micro-nano structure on the polypropylene surface, etc.

The polypropylene surface having a micro-nano structure as the grafting base can be an independent article or exist on a substrate. The substrate may be composed mainly of polypropylene. The substrate is, for example, a film, sheet, plate, or molded article.

In one embodiment, the polypropylene surface having a micro-nano structure as the grafting base may be a polypropylene porous membrane, a polypropylene flat membrane or a polypropylene hollow fiber microporous membrane.

The polypropylene porous membrane may have an average pore diameter of less than 100 μm, preferably 10 nm-80 μm, and the porosity of the polypropylene porous membrane may be 50-90%, preferably 60-80%. The average pore diameter is determined by observing the microporous surface using a scanning electron microscope, statistically analyzing the pore diameter data, and plotting a pore diameter distribution diagram. The porosity is measured using the mercury intrusion porosimetry (MIP).

The term "polypropylene" as used herein includes homopolymers and copolymers of propylene and mixtures thereof.

The grafted hydrophilic side group according to the present invention may comprise a unit formed from a hydrophilic monomer, for example, comprising a unit formed from one or more monomers containing a heteroatom selected from the group consisting of oxygen, sulfur, nitrogen, silicon, and halogen and combinations thereof or a substituent thereof and containing a carbon-carbon double bond.

The hydrophilic side group is preferably a monomer side group containing a heteroatom selected from the group consisting of oxygen, sulfur, nitrogen, silicon, and halogen and combinations thereof or a substituent thereof and containing a carbon-carbon double bond. The monomer for the hydrophilic side group is preferably at least one of an organic acid, a derivative of an organic acid and a vinyl silane. The derivative of an organic acid may include at least one of anhydrides, esters, and salts of the organic acid. The organic acid includes, but is not limited to, carboxylic acid, sulfonic acid, sulfinic acid, thiocarboxylic acid (RCOSH) and the like.

The monomers for the hydrophilic side groups further preferably include organic acids and derivatives of organic acids selected from the group consisting of maleic anhydride, maleic anhydride derivatives, (meth)acrylic acid, (meth)acrylic acid derivatives (e.g., glycidyl methacrylate), vinyl acetate, alkenyl sulfonic acid and derivatives thereof (e.g., 2-acrylamido-2-methylpropanesulfonic acid, propenyl sulfonic acid, vinyl benzene sulfonic acid, vinyl sulfonic acid, etc.), vinyl benzoic acid, itaconic acid, oleic acid, arachidonic acid and combinations thereof and salt forms thereof; most preferably maleic anhydride, maleic anhydride derivatives, (meth)acrylic acid, (meth)acrylic acid derivatives and combinations thereof and salt forms thereof; even more preferably maleic anhydride and salt forms thereof.

The vinyl silane may be one or more of the compounds represented by Formula (1):

$$CH_2{=}CH{-}(CH_2)_n SiX_3 \qquad\qquad \text{Formula (1)}$$

wherein n=0 to 3, each X is the same or different and independently represents a chloro group, a methoxy group, an ethoxy group, and an acetoxy group.

The vinyl silane is preferably at least one of vinyl trimethoxy silane and vinyl triethoxy silane.

Preferably, the hydrophilic side group comprises or consists of a unit formed from a salt of an organic acid.

In a preferred embodiment, the polypropylene surface can be grafted with a lipophilic side group at the same time to further improve the lipophilicity of the surface. Preferably, after modification, the oil contact angle of the superwetting surface can reach less than 90°, preferably less than or equal to 10°, more preferably less than or equal to 5°, still more preferably less than or equal to 1°, and most preferably down to about 0°, and preferably, the above angle is reached within about 0.5 s.

The lipophilic side group may comprise a unit formed from a lipophilic monomer. The lipophilic monomer preferably includes at least one of vinyl silicone oil and styrene. The lipophilic side group is preferably selected from the group consisting of vinyl silicone oil side groups, styrene side groups and combinations thereof.

The vinyl silicone oil usually refers to a polysiloxane with a vinyl group and is liquid at room temperature, and mainly refers to a linear polydimethylsiloxane having vinyl groups in the middle segment or at two ends. The vinyl silicone oil can be used as a macromonomer.

The vinyl silicone oil can be selected from the group consisting of vinyl-terminated silicone oils, high-vinyl silicone oils and combinations thereof, and preferably can be at least one of methyl vinyl silicone oil, vinyl hydrogen-containing silicone oil and divinyl silicone oil.

The water contact angle of the superwetting surface according to the present invention is significantly smaller than the water contact angle of the polypropylene surface prior to the modification treatment.

According to the present invention, after grafting the polypropylene surface having a micro-nano structure with a hydrophilic side group, the resulting superwetting surface can achieve super-hydrophilic effect. At the same time, the polypropylene surface can be further grafted with a lipophilic monomer for lipophilic modification, thereby further improving the lipophilicity of the super-hydrophilic surface, which lipophilicity is improved compared with both unmodified polypropylene surface and only hydrophilically modified polypropylene surface.

In the case of polypropylene porous membrane, polypropylene flat membrane or polypropylene hollow fiber microporous membrane, after the hydrophilic side groups are grafted according to the present invention, the membrane can achieve super-hydrophilic effect, while water flux is also greatly increased. The hydrophilically modified membrane can be further grafted with lipophilic monomers such as vinyl silicone oil, so that the lipophilicity of the membrane is also further improved, and its oil flux is increased compared with both unmodified membrane and only hydrophilically modified membrane.

According to a second aspect of the present invention, the present invention provides a method for the preparation of a superwetting surface according to the present invention, comprising subjecting a monomer for forming a side group and a polypropylene surface having a micro-nano structure as the grafting base to grafting reaction by microwave irradiation, in the absence of an initiator, optionally in the case of adding an inorganic microwave absorbing medium. During the grafting reaction, auxiliary grafting monomers may not be used.

The term "microwave" as used herein refers to electromagnetic waves having a frequency of 300 MHz to 300 GHz.

In the method according to the present invention, components including the monomer for the hydrophilic side group, or components including the monomer for the hydrophilic side group and the monomer for the lipophilic side group, and the polypropylene surface may be subjected to grafting reaction using microwave irradiation without the addition of a grafting initiator, to obtain the superwetting surface.

When the components do not include the monomer for the lipophilic side group, optionally and preferably, an inorganic microwave absorbing medium is added; and when the components include the monomer for the lipophilic side group, an inorganic microwave absorbing medium is added.

When the monomer for the hydrophilic side group is at least one of an organic acid or an anhydride or ester thereof, the method may further include a step of reacting the product obtained after the grafting reaction with a base (i.e., so-called salinization step).

In the preparation method of the present invention, the microwave irradiation grafting reaction may include the microwave irradiation grafting reaction of the hydrophilic side group only; or both the microwave irradiation grafting reaction of the lipophilic side group and the microwave irradiation grafting reaction of the hydrophilic side group, the microwave irradiation grafting reactions of the two kinds of side groups can occur simultaneously or successively, and the order is not limited.

The salinization step is an optional step. When the polypropylene surface is grafted with at least one side group of an organic acid or an anhydride or ester thereof, such a salinization step can be carried out, but it is not limited to whether it is performed before or after or during the microwave irradiation grafting reaction of the lipophilic side group, that is, it is possible to add a base while carrying out the microwave irradiation grafting of the lipophilic side group on the grafted polypropylene surface with the monomer for the hydrophilic side group being at least one of an organic acid or an anhydride or ester thereof, for the salinization of the above hydrophilic side group.

The preparation method of the present invention may specifically include any one of the following approaches:

1) comprising contacting and mixing the polypropylene surface with the monomer for the hydrophilic side group and/or a solution in which the monomer is dissolved in a solvent, wherein an inorganic microwave absorbing medium is optionally added; and then subjecting the resulting mixture to microwave irradiation grafting without the addition of a grafting initiator; wherein the mixture optionally further comprises a monomer for lipophilic side group and/or a solution in which the monomer is dissolved in a solvent, as well as an inorganic microwave absorbing medium;

2) comprising contacting and mixing the polypropylene surface with the monomer for the hydrophilic side group and/or a solution in which the monomer is dissolved in a solvent, wherein an inorganic microwave absorbing medium is optionally added; then subjecting the resulting mixture to microwave irradiation grafting without the addition of a grafting initiator; and then mixing the obtained grafted product with the monomer for the lipophilic side group and/or a solution in which the monomer is dissolved in a solvent as well as an inorganic microwave absorbing medium and performing microwave irradiation grafting without the addition of a grafting initiator;

3) comprising contacting and mixing the polypropylene surface with the monomer for the lipophilic side group and/or a solution in which the monomer is dissolved in a solvent as well as an inorganic microwave absorbing medium, then subjecting the resulting mixture to microwave irradiation grafting without the addition of a grafting initiator; then mixing the obtained grafted product with the monomer for the hydrophilic side group and/or a solution in which the monomer is dissolved in a solvent under the condition of optionally adding an inorganic microwave absorbing medium and performing microwave irradiation grafting without the addition of a grafting initiator;

4) on the basis of any one of the above three approaches, when the monomer for the hydrophilic side group is at least one of an organic acid or an anhydride or ester thereof, further comprising the step of contacting and mixing the polypropylene surface grafted with at least one side group of an organic acid or an anhydride or ester thereof with a base and/or an aqueous solution of the base (i.e., so-called salinization step).

Since no initiator or grafting initiator is added in the preparation method of the present invention, the superwetting surface of the present invention obtained by the preparation method does not contain an initiator residue. The initiator refers to a substance used in the art to initiate the polymerization reaction (including grafting reaction) of monomers, such as free radical initiators, including peroxide initiators, azo initiators, redox initiators, etc., also photoinitiators (or photosensitizers), e.g., benzophenone. Peroxide initiators can be divided into organic peroxide initiators (e.g., dicumyl peroxide) and inorganic peroxide initiators. The initiator particularly refers to various initiators used for grafting functional monomers onto polypropylene, e.g., dicumyl peroxide and the like. In the prior art grafting methods, in order to graft polypropylene with a monomer, the tertiary carbon of polypropylene is dehydrogenated by an initiator, but actually the initiator can not only dehydrogenate, but also cause β-chain scission reaction in polypropylene to a large extent, that is, the reaction is too vigorous to be controlled, thereby affecting the mechanical properties of grafted polypropylene. The preparation method of the present invention can graft side groups such as organic acid, organic acid derivative, vinyl silane, vinyl silicone oil and styrene and the like on the surface of polypropylene without the addition of an initiator. Therefore, the superwetting surface obtained by the present invention does not contain an initiator residue, to thereby ensure that the mechanical properties of the polypropylene surface are not adversely affected.

The monomer for the hydrophilic side group used in the preparation method of the present invention may be various hydrophilic monomers, and is specifically described above. The amount of the monomer for the hydrophilic side group may be 0.1-10% by weight based on the amount of the polypropylene surface; and preferably 1-8% by weight.

Herein, when the polypropylene surface as the grafting base is an independent article, if the thickness of the article is less than or equal to 1 mm, the amount of the polypropylene surface is calculated according to the total weight of the article; and if the thickness of the article is greater than 1 mm, the amount of the polypropylene surface is calculated according to the weight of an article with a thickness of 1 mm. When the polypropylene surface as the grafting base is present on a substrate, the amount of the polypropylene surface is calculated according to the weight of the overall substrate including the polypropylene surface from the surface in contact with air to a position at 1 mm thickness in the direction from the polypropylene surface to the interior of the substrate; and if the thickness of the overall substrate including the polypropylene surface is less than or equal to 1 mm, it is calculated according to the total weight of the overall substrate including the polypropylene surface.

The monomer for the hydrophilic side group can be directly contacted and mixed with the polypropylene surface or the polypropylene surface grafted with a lipophilic monomer, or for a better mixing effect, a solution of the monomer for the hydrophilic side group in one or more solvents can be used for mixing. The amount of the solvent is only required in such an extent that it can dissolve the monomer to form a solution, and preferably, in the solution of the monomer for the hydrophilic side group, the weight ratio of the monomer to the solvent is (0.1-100): 100, preferably (0.5-50):100, and more preferably (1-30):100. Preferably, the monomer solution is used in such an amount that it can completely cover the polypropylene surface, so as to facilitate the sufficient contacting and mixing of them two.

The solvent used to dissolve the monomer for the hydrophilic side group can be at least one selected from the group consisting of water and organic solvents; preferably, it includes at least one of alcohols, ketones, esters and water, more preferably acetone or ethanol.

The monomer for the lipophilic side group used in the preparation method of the present invention may be various lipophilic monomers, and is specifically described above. The amount of the monomer of the lipophilic side group may be 0.1-30% by weight based on the amount of the polypropylene surface; and preferably 1-20% by weight.

The monomer of the lipophilic side group can be directly contacted and mixed with the polypropylene surface or the polypropylene surface grafted with a hydrophilic monomer, or for a better mixing effect, a solution of the monomer of the lipophilic side group in one or more solvents can be used for mixing. The amount of the solvent is only required in such an extent that it can dissolve the monomer to form a solution, and preferably, the weight ratio of the monomer for the lipophilic side group to the solvent may be (0.1-100): 100, preferably (0.5-50):100, and more preferably (1-30): 100. Preferably, the monomer solution is used in such an amount that it can completely cover the polypropylene surface, so as to facilitate the sufficient contacting and mixing of them two.

The solvent used to dissolve the monomer for the lipophilic side group can be at least one selected from the group consisting of water and organic solvents; preferably, it includes at least one of alcohols, ketones, esters and water, more preferably acetone or ethanol.

In the preparation method of the present invention, when the polypropylene surface is grafted with a hydrophilic side group only, an inorganic microwave absorbing medium may not be added to the mixture of the monomer and the polypropylene surface, but it is preferable to add an inorganic microwave absorbing medium to increase the grafting efficiency. When the polypropylene surface needs to be grafted with a lipophilic side group, since generally the temperature increase of the monomer for the lipophilic side group under microwaves does not exceed 200° C. and the grafting reaction cannot proceed well, it is necessary to add an inorganic microwave absorbing medium to promote the grafting reaction under microwaves.

The inorganic microwave absorbing medium can use various inorganic substances that can absorb microwaves, preferably including at least one of metal hydroxides, metal salts, metal oxides, graphite materials, ferroelectric materials, chalcopyrite and electrolytic stone.

The metal hydroxide can be at least one of potassium hydroxide, barium hydroxide, sodium hydroxide, lithium hydroxide, strontium hydroxide, calcium hydroxide, iron hydroxide, ferrous hydroxide, zinc hydroxide, magnesium hydroxide, cobalt hydroxide, gold hydroxide, aluminum hydroxide, copper hydroxide, beryllium hydroxide, and rare earth hydroxide; the metal salt can be at least one selected from the group consisting of ammonium nitrate, potassium nitrate, sodium nitrate, barium nitrate, calcium nitrate, magnesium nitrate, aluminum nitrate, manganese nitrate, zinc nitrate, ferric nitrate, ferrous nitrate, copper nitrate, silver nitrate, ammonium chloride, potassium chloride, sodium chloride, barium chloride, calcium chloride, magnesium chloride, aluminum chloride, manganese chloride, zinc chloride, ferric chloride, ferrous chloride, copper chloride, ammonium sulfate, potassium sulfate, sodium sulfate, calcium sulfate, magnesium sulfate, aluminum sulfate, manganese sulfate, zinc sulfate, iron sulfate, ferrous sulfate, copper sulfate, silver sulfate, ammonium carbonate, potassium carbonate, sodium carbonate, magnesium carbonate, calcium carbonate, barium carbonate, potassium dihydrogen phosphate, barium titanate, strontium titanate, and copper calcium titanate; the metal oxide can be at least one selected from the group consisting of ferric oxide and ferroferric oxide; and the graphite material can be at least one selected from the group consisting of carbon black, graphite powder, graphene, reduction product of graphene oxide (the reducing agent is for example ascorbic acid), carbon nanotubes, and activated carbon.

The amount of the inorganic microwave absorbing medium in single usage can be 0.1-10% by weight of the amount of the polypropylene surface; and preferably 1-8% by weight. The amount of the inorganic microwave absorbing medium in single usage means that the preparation method of the present invention may include one or several times of microwave irradiation, and if the inorganic microwave absorbing medium is added therein, the amount is the added amount for a single microwave irradiation.

The inorganic microwave absorbing medium can be directly added to contact and mix with the polypropylene surface or grafted polypropylene surface, or for a better mixing effect, an inorganic microwave absorbing medium solution or dispersion obtained by dissolving or dispersing in one or more solvents is added for contacting and mixing. In order to better disperse and mix the inorganic microwave absorbing medium on the (grafted) polypropylene surface, preferably, the mixing of the inorganic microwave absorbing medium with the (grafted) polypropylene surface and the mixing with other components such as monomers are carried out in steps, that is, the (grafted) polypropylene surface can be separately mixed with the monomer component and dried, and then the dried mixture is mixed with at least one of the inorganic microwave absorbing medium or the solution or dispersion thereof.

The amount of the solvent used to dissolve or disperse the microwave absorbing medium is only required in such an extent that it can dissolve the inorganic microwave absorbing medium to form an inorganic microwave absorbing medium solution, or it can sufficiently and uniformly disperse the inorganic microwave absorbing medium to form a dispersion. In the inorganic microwave absorbing medium solution or dispersion, the weight ratio of the inorganic microwave absorbing medium to the solvent may preferably be in the range of (0.1-100): 100, more preferably (0.5-50): 100, and most preferably (1-30): 100.

The inorganic microwave absorbing medium solution or dispersion is preferably used in such an amount that it can completely cover the starting material mixture including the (grafted) polypropylene surface, so as to facilitate the sufficient contacting, mixing and reacting of the starting materials.

The solvent in the inorganic microwave absorbing medium solution or dispersion is at least one selected from the group consisting of water and organic solvents; preferably, it includes at least one of alcohols, ketones, esters, and water, more preferably alcohols and water.

In order to ensure that the inorganic microwave absorbing medium can form a sufficiently dispersed and stable dispersion with the solvent, a surfactant commonly used in the prior art can be added to the inorganic microwave absorbing medium dispersion. Generally, surfactants such as polyoxyethylene type and polyol type can be used, and the used amount can be usually 0.1-100% by weight of the inorganic microwave absorbing medium.

The base used in the salinization step can be selected from the bases that can salinize any one of the organic acid side group, its acid anhydride side group, and its ester side group grafted onto the polypropylene surface; and preferably it is a hydroxide.

The hydroxide is preferably at least one of metal hydroxides and ammonia water; wherein the metal hydroxide is preferably one or more of sodium hydroxide, potassium hydroxide, barium hydroxide, lithium hydroxide, strontium hydroxide, calcium hydroxide, iron hydroxide, ferrous hydroxide, zinc hydroxide, magnesium hydroxide, cobalt hydroxide, gold hydroxide, aluminum hydroxide, copper hydroxide, beryllium hydroxide and rare earth hydroxide, and preferably one or more of sodium hydroxide, potassium hydroxide, barium hydroxide, lithium hydroxide, strontium hydroxide and calcium hydroxide.

The amount of the base (for example, hydroxides) can be 0.1-10% by weight based on the amount of the polypropylene surface; and preferably 1-8% by weight.

In order to contact and mix the base with the grafted polypropylene surface, the base can be added directly for contacting and mixing, or in order to facilitate sufficient mixing, preferably, the base in the form of an aqueous solution is used for sufficient mixing. The amount of water used to dissolve the base is also only required in such an extent that it can dissolve the base to form an aqueous solution. In the aqueous solution of the base, the weight ratio of the base to water may preferably be (0.1-100):100, more preferably (0.5-50):100, and most preferably (1-30):100. The amount of the aqueous solution of the base can preferably completely cover the grafted polypropylene surface, so as to facilitate the sufficient contacting, mixing and reacting of the two.

The base and/or the aqueous solution of the base can be sufficiently mixed with the grafted polypropylene surface and react therewith at the same time, which is a common acid-base reaction, and the reaction time is not specially required as long as it lasts until the reaction is sufficient. Generally, after the completion of the addition of the base and/or the aqueous solution, further contacting and mixing is performed while at the same time reacting for a period of time, for example, possibly within 30 minutes, preferably 5-10 minutes. Both the reaction temperature and pressure are not restricted and generally can be normal temperature and normal pressure.

The microwave irradiation process in the preparation method of the present invention can be carried out in various microwave reactors. The microwave irradiation process can be carried out with any suitable irradiation power and last for any suitable time, as long as a suitable graft modification effect can be achieved on the polypropylene surface and thus the superwetting property according to the present invention can be achieved. For example, the irradiation power may be 100 W-2000 W, preferably 500-1000 W, and more preferably 600 W-800 W; the irradiation time may be 1 s-120 min, preferably 1 min-30 min, and more preferably 3 min-10 min.

The microwave irradiation can preferably be carried out under an inert atmosphere. The inert atmosphere may use an inert gas, preferably one or more of nitrogen, helium and argon, and more preferably nitrogen.

In the preparation method of the present invention, the above-mentioned mixing is preferably carried out under vacuum condition. The mixing includes contact mixing of the monomer for the hydrophilic side group and/or solution thereof with the (grafted) polypropylene surface, contact mixing of the monomer for the lipophilic side group and/or solution thereof with the (grafted) polypropylene surface, contact mixing of the grafted polypropylene surface with the base and/or aqueous solution of the base, etc.

For the polypropylene surface per se having a micro-nano structure such as micropores, vacuum is favorable for more sufficient contact mixing of the grafting monomer and/or base and other components therewith, and promotes the entry of the grafting monomer and/or base and other components into the micro-nano structure of the polypropylene surface, which is more advantageous for the proceeding of the reaction.

In the preparation method of the present invention, the contact mixing can be carried out by various mixing methods and equipment, and the mixing conditions are also common conditions, as long as the various materials can be sufficiently and uniformly mixed; for example, the starting materials of the components including the monomers other than the polypropylene surface, or their solution, dispersion, etc. can be coated, dripped, infiltrated, and covered on the polypropylene surface to achieve contact mixing.

Preferably, the mixture of the components including the monomer and the (grafted) polypropylene surface is subjected to drying treatment prior to the microwave irradiation.

Preferably, the product after the microwave irradiation grafting can be washed with a solvent to remove the unreacted monomer or/and inorganic microwave absorbing medium that does not participate in the reaction, and is preferably subjected to further drying treatment after washing.

There is no special restriction on the washing of the product after microwave irradiation, as long as the residual monomer or inorganic microwave absorbing medium can be removed. Common washing methods can be used. For example, after microwave, a solvent whose volume exceeds the polypropylene surface is used immediately to soak for a specific period of time (for example, 5-15 minutes) at a high temperature, and then a filtering device is used to remove the redundant water; the soaking and filtering are repeated multiple times (for example, 2-6 times), and a clean superwetting surface can be thus obtained.

The product of the salinization step (i.e., the product after the reaction of the grafting reaction product and the base) can preferably be washed with a solvent to remove the base that is not reacted with the grafted polypropylene surface, and is preferably further dried after washing.

There is no special restriction on the washing of the product after salinization, as long as the residual base can be removed, and common washing methods can be used. For example, after the salinization reaction, a solvent whose volume exceeds the grafted polypropylene surface is used immediately to soak for a specific period of time (for example, 5-15 minutes), and then a filtering device is used to remove the redundant water; the soaking and filtering are repeated multiple times (for example, 2-6 times), and a clean amphiphilic polypropylene surface can be thus obtained.

The washing solvent can be at least one selected from the group consisting of water and organic solvents; preferably it includes at least one of alcohols, ketones, esters and water, more preferably alcohols and water.

Various conventional drying methods can be used for the drying treatment involved, including but not limited to, air blast drying, room temperature drying and the like. The preferred drying temperature is such a temperature that the polypropylene does not melt, for example, which is not more than 160° C.

In a third aspect of the present invention, the present invention provides an article consisting of or comprising a superwetting surface according to the present invention. The article can be a film, sheet, plate or molded article, for example, polypropylene porous membrane, polypropylene flat membrane or polypropylene hollow fiber microporous membrane, plastic article to be bonded, outer packaging of food bag to be sprayed, automobile bumper to be sprayed, etc. The article may be composed mainly of polypropylene.

In a fourth aspect of the present invention, the present invention provides applications of the superwetting surface according to the present invention or the article comprising the superwetting surface in fields of bonding (e.g., bonding of plastic articles, etc.) and spraying (e.g., spraying of the outer packaging of food bags, spraying of the automobile bumper, etc.), or in fields of oil-water separation, water treatment, biology, medicine and energy. Correspondingly, the present invention also provides a method of bonding, spraying, oil-water separation or water treatment using the superwetting surface or article according to the present invention, for example, for preparing a bonded plastic article, a sprayed outer packaging of food bags, and a sprayed automobile bumper.

For example, the amphiphilic polypropylene porous membrane obtained according to the present invention can be particularly used in oil-water separation, water treatment, biology, medicine, energy and other fields.

The superwetting surface of the present invention can achieve super-hydrophilicity, or even can achieve super-amphiphilicity. The present invention obtains the super-hydrophilic polypropylene surface by subjecting hydrophilic monomers such as organic acids and organic acid derivatives and polypropylene surface to grafting reaction using microwave irradiation without the addition of an initiator, or even by comprising a further salinization, and further due to the lipophilicity of the polypropylene per se, at this time a lipophilic and super-hydrophilic surface has already been formed; optionally a further grafting reaction with lipophilic monomers such as vinyl silicone oil is performed using microwave irradiation without the addition of an initiator, thereby further improving the lipophilicity of the superwetting surface, or even obtaining a super-amphiphilic superwetting surface. Polypropylene is microwave transparent in a microwave environment (it absorbs little or no microwaves under microwave irradiation, thus it does not generate heat under microwave irradiation). The monomers such as organic acids and organic acid derivatives used as the grafting monomers will absorb microwaves under microwave condition to achieve a temperature increase up to 200° C. or more, and generate free radicals; meanwhile, the high temperature will also initiate the nearby polypropylene molecular chains to generate free radicals, thus a sufficient grafting reaction with polypropylene occurs, thereby obtaining a grafted polypropylene surface. Meanwhile, such microwave grafting reaction without the addition of an initiator can largely avoid the β chain scission reaction of polypropylene when grafting with the addition of an initiator, thereby not reducing the molecular weight of the polypropylene.

When the polypropylene grafted with the side group of one of organic acids or anhydrides thereof or esters thereof further reacts with a base such as hydroxide, the grafted polypropylene surface becomes into an organic acid salt-grafted polypropylene surface, which further improves the hydrophilicity of the polypropylene surface. For polypropylene porous membrane, polypropylene flat membrane, polypropylene hollow fiber microporous membrane and the like, water flux is also greatly increased. In the case of further performing lipophilic modification to the super-hydrophilic polypropylene surface, lipophilic monomers such as vinyl silicone oil have a low polarity, they absorb microwaves under microwave irradiation while the temperature increase cannot reach quite a high temperature (the temperature in microwave field increases up to less than 200° C.), then the nearby polypropylene molecular chains cannot be effectively initiated to generate free radicals, thus it is necessary to add an inorganic microwave absorbing medium to help polypropylene to generate free radicals and thereby be involved in grafting reaction with the vinyl silicone oil monomers. Inorganic microwave absorbing medium does not react with the polypropylene surface and the monomers, and thus it merely serves as the heat source of the grafting reaction and does not affect the properties of polypropylene surface. For the monomers that do not absorb microwaves, the addition of an inorganic microwave absorbing medium can help them to graft onto polypropylene; and for the monomers that absorb microwaves per se, such addition can contribute to increase the grafting efficiency thereof. The present invention heats the inorganic microwave absorbing medium by utilizing the selective heating of microwaves, and its temperature can increase under microwaves up to a temperature of 200° C. or higher and reach near the melting point of polypropylene. Under said temperature, polypropylene will not have its chains broken, but the tertiary carbon of polypropylene can be dehydrogenated, and thus grafting reaction will occur but chain scission reaction will not be caused. After lipophilic monomers such as vinyl silicone oil are grafted, the lipophilicity of the super-hydrophilic polypropylene surface is further improved.

Meanwhile, since the polypropylene surface used in the present invention has a micro-nano structure, the capillary action existing in said structure further improves the hydrophilic and lipophilic effects of the surface.

The preparation method of the present invention is simple in process and easy to operate. Such modification method is suitable for various polypropylene surfaces employs simple equipment, needs low cost, and can be easily industrialized. The obtained superwetting surface has a durable and stable superwetting property, and has no residual grafting monomers, no residual base, no initiator residue and the like. In the preparation process, the molecular weight of the grafted polypropylene does not decrease. For polypropylene porous membrane, polypropylene flat membrane, polypropylene hollow fiber microporous membrane and the like, the membranes after grafting modification have the water flux or both the water flux and oil flux greatly increased.

EXAMPLES

In the following, the present invention is further illustrated in combination with the examples. However, the scope of the present invention is not limited by these examples, but the scope of the present invention is set forth in the appended claims.

1. Measurement Methods

1) Method for Testing Contact Angle

The EASY DROP contact angle tester from the KRUSS company, Germany, with a measurement range of 1-180° and a resolution of ±0.1°, was used, and a dynamic contact angle measurement mode was adopted, deionized water droplet or oil droplet (white oil droplet or peanut oil droplet) having a fixed volume of 2 μL in each measurement was dropped on the surface to be tested, the calculated initial (within 0.5 s) contact angle was taken as the contact angle measurement value of the surface; and parallel measurements were performed for 6 times to calculate the average value. When the measurement value was lower than the measurement lower limit of the instrument (1°), the data was recorded as 0.

The white oil was purchased from Tianma (Karamay) Petroleum Company, and the peanut oil was purchased from Shandong Luhua Group Co., Ltd.

2) Method for Determination of the Content of the Grafted Side Groups on the Surface:

The energy spectrum accessory of the 54800 scanning electron microscope from the Hitachi Company, Japan was used to measure the contents of the main elements of the grafted component on the surface to be tested, and the content of the graft on the surface inversely inferred by the molecular formula of the graft was taken as the surface graft ratio. Since the content was the surface content (usually, a content in the thickness of 1-2 mm from the surface of the object), said content was higher than the content of the monomers in the starting material.

3) Method for Determination of the Water and Oil Fluxes 5 pieces of surfaces to be tested, for example, polypropylene porous membrane, were removed of the skin layer using a freezing microtome knife to prepare a membrane assembly. Under normal pressure, deionized water, chloroform and peanut oil were used for filtration for 30 min, and the obtained values were the water and oil fluxes of the surface or membrane.

4) Method for Determination of the Average Pore Diameter and the Average Size of the Micropores:

A scanning electron microscope (Japan Hitachi S-4800 field emission scanning electron microscope, magnification: 5000) was used to observe the surface of the pores or micropores, the pore diameter data were counted, and a pore diameter distribution diagram was plotted to determine the average pore diameter and the average size of the micropores.

The porosity was determined using mercury intrusion porosimetry (MIP), wherein a mercury intrusion meter (Poremaster-33, Quantachrome, USA) was used.

2. Starting Materials and Equipment Used in Examples and Comparative Examples

1) Polypropylene Surface Samples Having a Micro-Nano Structure

Surface sample 1: Using a polypropylene flat membrane from Tianjin Motimo Membrane Engineering Technology Co., Ltd. (an average pore diameter of 0.8 μm, and a porosity of 80%), seal coating the membrane, on one side thereof, with an epoxy resin glue (3M company DP100NS), and, on the other side thereof, removing the skin layer using a Leica CM3600 cryomicrotome in a liquid nitrogen atmosphere to obtain the polypropylene microporous surface sample 1, with an average size of micropores on the surface of 0.8 μm.

Surface sample 2: Injecting a polypropylene resin (T30S Qilu Petrochemical, MI=3 g/10 min) to obtain a 5 cm×5 cm thin sheet having a thickness of 1 mm, and using a micro-miniature ultra-precision micro-milling machine to prepare a surface having a micron structure, specifically, milling laterally and longitudinally respectively along the thin sheet surface to obtain a surface micro-nano structure with an average upper surface size of 0.5 μm.

Surface sample 3: Injecting a polypropylene resin (T30S Qilu Petrochemical, MI=3 g/10 min) to obtain a 5 cm×5 cm thin sheet having a thickness of 1 mm, and using a nano-imprinting machine to prepare a surface having a nano structure, specifically, imprinting a surface micro-nano structure of small pits and protrusions having an average size of 80 nm.

Surface sample 4: Polypropylene porous membrane (Tianjin Motimo Membrane Engineering Technology Co., Ltd., specification 1: an average pore diameter of 0.8 μm, and a porosity of 80%). Surface sample 5: Polypropylene porous membrane (Tianjin Motimo Membrane Engineering Technology Co., Ltd., specification 2: an average pore diameter of 0.22 μm, and a porosity of 45%). 2) Maleic anhydride (Xilong Science Co., Ltd.), acrylic acid (Sinopharm Chemical Reagent Co., Ltd.), methacrylic acid (Sinopharm Chemical Reagent Co., Ltd.), 2-acrylamido-2-methylpropanesulfonic acid (Sinopharm Chemical Reagent Co., Ltd.), sodium hydroxide (Xilong Science Co., Ltd.), potassium hydroxide (Xilong Science Co., Ltd.), calcium hydroxide (Xilong Science Co., Ltd.), acetone (Xilong Science Co., Ltd.), sodium chloride (Sinopharm Chemical Reagent Co., Ltd.), vinyl silicone oil (methyl vinyl silicone oil, Shandong Dayi Chemical Co., Ltd., tradename: DY-V401, linear type, molecular formula: $(CH_2=CH)Si(CH_3)_2O[(CH_3)_2SiO]_n(CH_3)_2Si(CH=CH_2))$, vinyl hydrogen-containing silicone oil (Shandong Dayi Chemical Co., Ltd., tradename: DY-H202, molecular formula: $(CH_3)_3SiO[(CH_3)(H)SiO]_nSi(CH_3)_3)$, divinyl silicone oil (Shandong Dayi Chemical Co., Ltd., tradename: DY-V421, linear type, molecular formula: $(CH_2=CH)(CH_3)_2SiO[(CH_3)_2SiO]_m[(CH_2=CH)(CH_3)SiO]_nSi(CH_3)_2(CH_2=CH))$, sodium chloride (Sinopharm Chemical Reagent Co., Ltd.), aqueous solution of graphene oxide (GO) (Nanjing JCNANO Tech Co., Ltd., a concentration of 1 wt %), ascorbic acid (J&K company), vinyl trimethoxysilane (Tokyo Chemical Industry Co., Ltd.), and styrene (Sinopharm Chemical Reagent Co., Ltd.).

Various other starting materials were commercially available.

3) Microwave Equipment: SINEO (Sineo) Multifunctional Microwave Synthesis Extraction Instrument, Model: UWave-2000.

Example 1

Based on 100 parts by mass of the polypropylene surface sample (surface sample 1), maleic anhydride (5 parts by mass) was dissolved in acetone (50 parts by mass) to obtain an acetone solution of maleic anhydride; sodium hydroxide (5 parts by mass) was dissolved in deionized water (50 parts by mass) to obtain an aqueous solution of sodium hydroxide; the acetone solution of maleic anhydride was added onto the polypropylene surface sample under vacuum to be sufficiently contacted and mixed therewith, and then the mixture was dried (dried by a blast drying oven at 80° C.). After drying, the dried mixture of the maleic anhydride and the polypropylene surface sample was microwave irradiated (a power of 700 W) for 5 minutes under nitrogen atmosphere; the product after the completion of the microwave irradiation was soaked in deionized water for 10 minutes, wherein the deionized water was replaced repeatedly 3 times to ensure the removal of the maleic anhydride monomer that did not participate in the grafting reaction, followed by placing it in a blast drying oven at 80° C. to be dried to obtain a dried maleic anhydride-grafted polypropylene surface sample; the aqueous solution of sodium hydroxide was sufficiently contacted and mixed with the dried maleic anhydride-grafted polypropylene surface sample under vacuum; after the completion of the addition of the aqueous solution of sodium hydroxide, further mixing and reaction continued for 5 minutes. After the reaction was completed, the reaction product was washed with deionized water according to the same washing step as above, and then placed in a blast drying oven at 80° C. to be dried, thereby a sodium maleate-grafted polypropylene surface sample was obtained.

Based on 100 parts by mass of the polypropylene surface sample, vinyl silicone oil (5 parts by mass) was dissolved in ethanol (50 parts by mass) to obtain an ethanol solution of vinyl silicone oil; sodium chloride (5 parts by mass) was dissolved in deionized water (50 parts by mass) to obtain an aqueous solution of sodium chloride; the ethanol solution of vinyl silicone oil was added onto the sodium maleate-grafted polypropylene surface sample obtained above under vacuum to be sufficiently contacted and mixed therewith, and then the mixture was dried (dried by a blast drying oven at 80° C.); after drying, the dried mixture of the vinyl silicone oil and the sodium maleate-grafted polypropylene surface sample was sufficiently contacted and mixed with the aqueous solution of sodium chloride, and then the mixture was dried (dried by a blast drying oven at 80° C.); the dried mixture was microwave irradiated (a power of 700 W) under nitrogen atmosphere for 5 min; the material after the completion of the microwave irradiation was soaked in deionized water for 10 minutes, wherein the deionized water was replaced repeatedly 3 times to ensure the removal of the vinyl silicone oil monomer that did not participate in the grafting reaction and sodium chloride, and then the obtained polypropylene surface sample was placed in a blast drying oven at 80° C. to be dried, thereby a polypropylene superwetting surface sample grafted with sodium maleate and vinyl silicone oil side groups was obtained. The data of the water and oil contact angles and the surface graft ratio of the obtained superwetting surface are shown in Table 1.

Example 2

Based on 100 parts by mass of the polypropylene surface sample (the same as in Example 1), maleic anhydride (5 parts by mass) was dissolved in acetone (50 parts by mass) to obtain an acetone solution of maleic anhydride; sodium hydroxide (5 parts by mass) was dissolved in deionized water (50 parts by mass) to obtain an aqueous solution of sodium hydroxide; the acetone solution of maleic anhydride was added onto the polypropylene surface sample under vacuum to be sufficiently contacted and mixed therewith, and then the mixture was dried (dried by a blast drying oven at 80° C.). After drying, the dried mixture of the maleic anhydride and the polypropylene surface sample was microwave irradiated (a power of 700 W) for 5 minutes under nitrogen atmosphere; the product after the completion of the microwave irradiation was soaked in deionized water for 10 minutes, wherein the deionized water was replaced repeatedly 3 times to ensure the removal of the maleic anhydride monomer that did not participate in the grafting reaction, followed by placing it in a blast drying oven at 80° C. to be dried to obtain a dried maleic anhydride-grafted polypropylene surface sample; the aqueous solution of sodium hydroxide was added onto the dried maleic anhydride-grafted polypropylene surface sample under vacuum to be sufficiently contacted and mixed therewith; after the completion of the addition of the aqueous solution of sodium hydroxide, further mixing and reaction continued for 5 minutes. After the reaction was completed, the reaction product was washed with deionized water according to the same washing step as above, and then placed in a blast drying oven at 80° C. to be dried, thereby a polypropylene superwetting surface sample grafted with sodium maleate side groups was obtained. The data of the water and oil contact angles and the surface graft ratio of the obtained superwetting surface are shown in Table 1.

Example 3

Based on 100 parts by mass of the polypropylene surface sample (the same as in Example 1), vinyl silicone oil (9 parts by mass) was dissolved in ethanol (50 parts by mass) to obtain an ethanol solution of vinyl silicone oil; sodium chloride (4 parts by mass) was dissolved in deionized water (50 parts by mass) to obtain an aqueous solution of sodium chloride; the ethanol solution of vinyl silicone oil was added onto the polypropylene surface sample under vacuum to be sufficiently contacted and mixed therewith, and then the mixture was dried (dried by a blast drying oven at 80° C.); after drying, the dried mixture of the vinyl silicone oil and the polypropylene surface sample was sufficiently contacted and mixed with the aqueous solution of sodium chloride, and then the mixture was dried (dried by a blast drying oven at 80° C.); the dried mixture was microwave irradiated (a power of 1000 W) under nitrogen atmosphere for 3 min; the material after the completion of the microwave irradiation was soaked in deionized water for 10 minutes, wherein the deionized water was replaced repeatedly 3 times to ensure the removal of the vinyl silicone oil monomer that did not participate in the grafting reaction and sodium chloride, followed by placing it in a blast drying oven at 80° C. to be dried, thereby a polypropylene surface sample grafted with vinyl silicone oil side groups was obtained.

Based on 100 parts by mass of the polypropylene surface sample, acrylic acid (9 parts by mass) was dissolved in acetone (50 parts by mass) to obtain an acetone solution of acrylic acid; potassium hydroxide (6 parts by mass) was dissolved in deionized water (50 parts by mass) to obtain an aqueous solution of potassium hydroxide; the acetone solution of acrylic acid was added onto the grafted polypropylene surface sample under vacuum to be sufficiently contacted and mixed therewith, and then the mixture was dried (dried by a blast drying oven at 80° C.). After drying, the dried mixture of the acrylic acid and the grafted polypropylene surface sample was microwave irradiated (a power of 1000 W) under nitrogen atmosphere for 3 min; the product after the completion of microwave irradiation was soaked in deionized water for 10 min, wherein the deionized water was replaced repeatedly 3 times to ensure the removal of the acrylic acid monomer that did not participate in the grafting reaction, followed by placing it in a blast drying oven at 80° C. to be dried to obtain a dried grafted polypropylene surface sample grafted with acrylic acid and vinyl silicone oil; the aqueous solution of potassium hydroxide was added onto the dried polypropylene surface sample grafted with acrylic acid and vinyl silicone oil under vacuum to be sufficiently contacted and mixed therewith; after the completion of the addition of the aqueous solution of potassium hydroxide, further mixing and reaction continued for 5 minutes. After the reaction was completed, the reaction product was washed with deionized water according to the same washing step as above, and then placed in a blast drying oven at 80°

C. to be dried, thereby a polypropylene superwetting surface sample grafted with potassium acrylate and vinyl silicone oil side groups was obtained. The data of the water and oil contact angles and the surface graft ratio of the obtained superwetting surface are shown in Table 1.

Example 4

Based on 100 parts by mass of the polypropylene surface sample (the same as in Example 1), acrylic acid (9 parts by mass) was dissolved in acetone (50 parts by mass) to obtain an acetone solution of acrylic acid; potassium hydroxide (6 parts by mass) was dissolved in deionized water (50 parts by mass) to obtain an aqueous solution of potassium hydroxide; the acetone solution of acrylic acid was added onto the polypropylene surface sample under vacuum to be sufficiently contacted and mixed therewith, and then the mixture was dried (dried by a blast drying oven at 80° C.). After drying, the dried mixture of the acrylic acid and the polypropylene surface sample was microwave irradiated (a power of 1000 W) under nitrogen atmosphere for 3 min; the product after the completion of microwave irradiation was soaked in deionized water for 10 min, wherein the deionized water was replaced repeatedly 3 times to ensure the removal of the acrylic acid monomer that did not participate in the grafting reaction, followed by placing it in a blast drying oven at 80° C. to be dried to obtain a dried acrylic acid-grafted polypropylene surface sample; the aqueous solution of potassium hydroxide was added onto the dried acrylic acid-grafted polypropylene surface sample under vacuum to be sufficiently contacted and mixed therewith; after the completion of the addition of the aqueous solution of potassium hydroxide, further mixing and reaction continued for 5 minutes. After the reaction was completed, the reaction product was washed with deionized water according to the same washing step as above, and then placed in a blast drying oven at 80° C. to be dried, thereby a polypropylene superwetting surface sample grafted with potassium acrylate side groups was obtained. The data of the water and oil contact angles and the surface graft ratio of the obtained superwetting surface are shown in Table 1.

Comparative Example 1

The polypropylene surface sample (the same as in Example 1) was directly tested, and the data of the water and oil contact angles of the polypropylene surface are shown in Table 1.

Example 5

Based on 100 parts by mass of the polypropylene surface sample (surface sample 2), 2-acrylamido-2-methylpropanesulfonic acid (10 parts by mass) was dissolved in acetone (50 parts by mass) to obtain an acetone solution of 2-acrylamido-2-methylpropanesulfonic acid; potassium hydroxide (6 parts by mass) was dissolved in deionized water (50 parts by mass) to obtain an aqueous solution of potassium hydroxide; the acetone solution of 2-acrylamido-2-methylpropanesulfonic acid was added onto the polypropylene surface sample under vacuum to be sufficiently contacted and mixed therewith, and then the mixture was dried (dried by a blast drying oven at 80° C.). After drying, the dried mixture of 2-acrylamido-2-methylpropanesulfonic acid and the polypropylene surface sample was microwave irradiated (a power of 1000 W) under nitrogen atmosphere for 3 min; the product after the completion of the microwave irradiation was soaked in deionized water for 10 minutes, wherein the deionized water was replaced repeatedly 3 times to ensure the removal of the 2-acrylamido-2-methylpropanesulfonic acid monomer that did not participate in the grafting reaction, followed by placing it in a blast drying oven at 80° C. to be dried to obtain a dried 2-acrylamido-2-methylpropanesulfonic acid-grafted polypropylene surface sample; the aqueous solution of potassium hydroxide was sufficiently contacted and mixed with the dried 2-acrylamido-2-methylpropanesulfonic acid-grafted polypropylene surface sample under vacuum; after the completion of the addition of the aqueous solution of potassium hydroxide, further mixing and reaction continued for 5 minutes. After the reaction was completed, the reaction product was washed with deionized water according to the same washing step as above, and then placed in a blast drying oven at 80° C. to be dried, thereby a polypropylene surface sample grafted with potassium 2-acrylamido-2-methylpropanesulfonate was obtained.

Based on 100 parts by mass of the polypropylene surface sample, vinyl hydrogen-containing silicone oil (9 parts by mass) was dissolved in ethanol (50 parts by mass) to obtain an ethanol solution of vinyl hydrogen-containing silicone oil; sodium chloride (4 parts by mass) was dissolved in deionized water (50 parts by mass) to obtain an aqueous solution of sodium chloride; the ethanol solution of vinyl hydrogen-containing silicone oil was added onto the above polypropylene surface sample grafted with potassium 2-acrylamido-2-methylpropanesulfonate under vacuum to be sufficiently contacted and mixed therewith, and then the mixture was dried (dried by a blast drying oven at 80° C.); after drying, the dried mixture of the vinyl hydrogen-containing silicone oil and the grafted polypropylene surface sample was sufficiently contacted and mixed with the aqueous solution of sodium chloride, and then the mixture was dried (dried by a blast drying oven at 80° C.); the dried mixture was microwave irradiated (a power of 1000 W) under nitrogen atmosphere for 3 min; the material after the completion of the microwave irradiation was soaked in deionized water for 10 minutes, wherein the deionized water was replaced repeatedly 3 times to ensure the removal of the vinyl hydrogen-containing silicone oil monomer that did not participate in the grafting reaction and sodium chloride, followed by placing it in a blast drying oven at 80° C. to be dried; thereby a superwetting surface sample grafted with potassium 2-acrylamido-2-methylpropanesulfonate and vinyl hydrogen-containing silicone oil side groups was obtained. The data of the water and oil contact angles and the surface graft ratio of the obtained superwetting surface are shown in Table 1.

Example 6

Based on 100 parts by mass of the polypropylene surface sample (the same as in Example 5), 2-acrylamido-2-methylpropanesulfonic acid (10 parts by mass) was dissolved in acetone (50 parts by mass) to obtain an acetone solution of 2-acrylamido-2-methylpropanesulfonic acid; potassium hydroxide (6 parts by mass) was dissolved in deionized water (50 parts by mass) to obtain an aqueous solution of potassium hydroxide; the acetone solution of 2-acrylamido-2-methylpropanesulfonic acid was added onto the polypropylene surface sample under vacuum to be sufficiently contacted and mixed therewith, and then the mixture was dried (dried by a blast drying oven at 80° C.). After drying, the dried mixture of 2-acrylamido-2-methylpropanesulfonic acid and the polypropylene surface sample was microwave irradiated (a power of 1000 W) under nitrogen atmosphere for 3 min; the product after the completion of the microwave irradiation was soaked in deionized water for 10 minutes, wherein the deionized water was replaced repeatedly 3 times to ensure the removal of the 2-acrylamido-2-methylpropane-sulfonic acid monomer that did not participate in the grafting reaction, followed by placing it in a blast drying oven at 80° C. to be dried to obtain a dried 2-acrylamido-2-methylpro-panesulfonic acid-grafted polypropylene surface sample; the aqueous solution of potassium hydroxide was added onto the dried 2-acrylamido-2-methylpropanesulfonic acid-grafted polypropylene surface sample under vacuum to be suffi-ciently contacted and mixed therewith; after the completion of the addition of the aqueous solution of potassium hydrox-ide, further mixing and reaction continued for 5 minutes. After the reaction was completed, the reaction product was washed with deionized water according to the same washing step as above, and then placed in a blast drying oven at 80° C. to be dried, thereby a superwetting surface sample grafted with potassium 2-acrylamido-2-methylpropanesulfonate side groups was obtained. The data of the water and oil contact angles and the surface graft ratio of the obtained superwetting surface are shown in Table 1.

Example 7

Based on 100 parts by mass of the polypropylene surface sample (the same as in Example 5), methacrylic acid (10 parts by mass) was dissolved in acetone (50 parts by mass) to obtain an acetone solution of methacrylic acid; calcium hydroxide (8 parts by mass) was dissolved in deionized water (50 parts by mass) to obtain an aqueous solution of calcium hydroxide; the acetone solution of methacrylic acid was added onto the polypropylene surface sample under vacuum to be sufficiently contacted and mixed therewith, and then the mixture was dried (dried by a blast drying oven at 80° C.). After drying, the dried mixture of the methacrylic acid and the polypropylene surface sample was microwave irradiated (a power of 2000 W) under nitrogen atmosphere for 1 min; the product after the completion of the microwave irradiation was soaked in deionized water for 10 minutes, wherein the deionized water was replaced repeatedly 3 times to ensure the removal of the methacrylic acid monomer that did not participate in the grafting reaction, followed by placing it in a blast drying oven at 80° C. to be dried to obtain a dried methacrylic acid-grafted polypropylene sur-face sample; the aqueous solution of calcium hydroxide was added onto the dried methacrylic acid-grafted polypropylene surface sample under vacuum to the sufficiently contacted and mixed therewith; after the completion of the addition of the aqueous solution of calcium hydroxide, further mixing and reaction continued for 5 minutes. After the reaction was completed, the reaction product was washed with deionized water according to the same washing step as above, and then placed in a blast drying oven at 80° C. to be dried, thereby a calcium methacrylate-grafted polypropylene surface sample was obtained.

Based on 100 parts by mass of the polypropylene surface sample, divinyl silicone oil (8 parts by mass) was dissolved in ethanol (50 parts by mass) to obtain an ethanol solution of divinyl silicone oil; sodium chloride (6 parts by mass) was dissolved in deionized water (50 parts by mass) to obtain an aqueous solution of sodium chloride; the ethanol solution of divinyl silicone oil was added onto the above potassium methacrylate-grafted polypropylene surface sample under vacuum to be sufficiently contacted and mixed therewith, and then the mixture was dried (dried by a blast drying oven at 80° C.); after drying, the dried mixture of the divinyl silicone oil and the grafted polypropylene surface sample was sufficiently contacted and mixed with the aqueous solution of sodium chloride, and then the mixture was dried (dried by a blast drying oven at 80° C.); the dried mixture was microwave irradiated (a power of 2000 W) under nitrogen atmosphere for 1 min; the material after the completion of the microwave irradiation was soaked in deionized water for 10 minutes, wherein the deionized water was replaced repeatedly 3 times to ensure the removal of the divinyl silicone oil monomer that did not participate in the grafting reaction and sodium chloride, followed by placing it in a blast drying oven at 80° C. to be dried; a polypro-pylene superwetting surface sample grated with calcium methacrylate and divinyl silicone oil side groups was obtained. The data of the water and oil contact angles and the surface graft ratio of the obtained superwetting surface are shown in Table 1.

Example 8

Based on 100 parts by mass of the polypropylene surface sample (the same as in Example 5), methacrylic acid (10 parts by mass) was dissolved in acetone (50 parts by mass) to obtain an acetone solution of methacrylic acid; calcium hydroxide (8 parts by mass) was dissolved in deionized water (50 parts by mass) to obtain an aqueous solution of calcium hydroxide; the acetone solution of methacrylic acid was added onto the polypropylene surface sample under vacuum to be sufficiently contacted and mixed therewith, and then the mixture was dried (dried by a blast drying oven at 80° C.). After drying, the dried mixture of the methacrylic acid and the polypropylene surface sample was microwave irradiated (a power of 2000 W) under nitrogen atmosphere for 1 min; the product after the completion of the microwave irradiation was soaked in deionized water for 10 minutes, wherein the deionized water was replaced repeatedly 3 times to ensure the removal of the methacrylic acid monomer that did not participate in the grafting reaction, followed by placing it in a blast drying oven at 80° C. to be dried to obtain a dried methacrylic acid-grafted polypropylene sur-face sample; the aqueous solution of calcium hydroxide was added onto the dried methacrylic acid-grafted polypropylene surface sample under vacuum to the sufficiently contacted and mixed therewith; after the addition of the aqueous solution of calcium hydroxide, further mixing and reaction continued for 5 minutes. After the reaction was completed, the reaction product was washed with deionized water according to the same washing step as above, and then placed in a blast drying oven at 80° C. to be dried, thereby a polypropylene superwetting surface sample grafted with calcium methacrylate side groups was obtained. The data of the water and oil contact angles and the surface graft ratio of the obtained superwetting surface are shown in Table 1.

Comparative Example 2

The polypropylene surface sample (the same as in Example 5) was directly tested, and the data of the water and oil contact angles of the polypropylene surface are shown in Table 1.

Example 9

Based on 100 parts by mass of the polypropylene surface sample (surface sample 3), methacrylic acid (6 parts by mass) was dissolved in acetone (50 parts by mass) to obtain an acetone solution of methacrylic acid; the acetone solution of methacrylic acid was added onto the polypropylene surface sample under vacuum to be sufficiently contacted and mixed therewith, and then the mixture was dried (dried by a blast drying oven at 80° C.). After drying, the dried mixture of the methacrylic acid and the polypropylene surface sample was microwave irradiated (a power of 500 W) under nitrogen atmosphere for 30 min; the product after the completion of the microwave irradiation was soaked in deionized water for 10 minutes, wherein the deionized water was replaced repeatedly 3 times to ensure the removal of the methacrylic acid monomer that did not participate in the grafting reaction, followed by placing it in a blast drying oven at 80° C. to be dried to obtain a dried methacrylic acid-grafted polypropylene surface sample.

Based on 100 parts by mass of the polypropylene surface sample, divinyl silicone oil (10 parts by mass) was dissolved in ethanol (50 parts by mass) to obtain an ethanol solution of divinyl silicone oil; sodium chloride (6 parts by mass) was dissolved in deionized water (50 parts by mass) to obtain an aqueous solution of sodium chloride; the ethanol solution of divinyl silicone oil was added onto the above methacrylic acid-grafted polypropylene surface sample under vacuum to be sufficiently contacted and mixed therewith, and then the mixture was dried (dried by a blast drying oven at 80° C.); after drying, the dried mixture of the divinyl silicone oil and the grafted polypropylene surface sample was sufficiently contacted and mixed with the aqueous solution of sodium chloride, and then the mixture was dried (dried by a blast drying oven at 80° C.); the dried mixture was microwave irradiated (a power of 500 W) under nitrogen atmosphere for 30 min; the material after the completion of the microwave irradiation was soaked in deionized water for 10 minutes, wherein the deionized water was replaced repeatedly 3 times to ensure the removal of the divinyl silicone oil monomer that did not participate in the grafting reaction and sodium chloride, followed by placing it in a blast drying oven at 80° C. to be dried; a polypropylene superwetting surface sample grated with methacrylic acid and divinyl silicone oil was obtained. The data of the water and oil contact angles and the surface graft ratio of the obtained superwetting surface are shown in Table 1.

Example 10

Based on 100 parts by mass of the polypropylene surface sample (the same as in Example 9), methacrylic acid (1 part by mass) was dissolved in acetone (50 parts by mass) to obtain an acetone solution of methacrylic acid; the acetone solution of methacrylic acid was added onto the polypropylene surface sample under vacuum to be sufficiently contacted and mixed therewith, and then the mixture was dried (dried by a blast drying oven at 80° C.). After drying, the dried mixture of the methacrylic acid and the polypropylene surface sample was microwave irradiated (a power of 500 W) under nitrogen atmosphere for 30 min; the product after the completion of the microwave irradiation was soaked in deionized water for 10 minutes, wherein the deionized water was replaced repeatedly 3 times to ensure the removal of the methacrylic acid monomer that did not participate in the grafting reaction, followed by placing it in a blast drying oven at 80° C. to be dried to obtain a dried methacrylic acid-grafted polypropylene surface sample.

Based on 100 parts by mass of the polypropylene surface sample, methyl vinyl silicone oil (2 parts by mass) was dissolved in ethanol (50 parts by mass) to obtain an ethanol solution of methyl vinyl silicone oil; an aqueous solution of graphene oxide (GO) (10 parts by mass) and ascorbic acid (1 part by mass) were dissolved in deionized water (50 parts by mass) to obtain a dispersion of graphene oxide (GO); the ethanol solution of methyl vinyl silicone oil was added onto the above methacrylic acid-grafted polypropylene surface sample under vacuum to be sufficiently contacted and mixed therewith, and then the mixture was dried (dried by a blast drying oven at 80° C.); after drying, the dried powder of the mixture of the methyl vinyl silicone oil and the grafted polypropylene surface sample was sufficiently contacted and mixed with the dispersion of graphene oxide (GO), and then the mixture was dried (dried by a blast drying oven at 80° C.), wherein graphene oxide, ascorbic acid and deionized water were mixed to form a dispersion of graphene oxide, after the dispersion of graphene oxide was mixed with the mixture of the methyl vinyl silicone oil and the grafted polypropylene surface sample, upon oven drying at 80° C., ascorbic acid acted as a reducing agent for graphene oxide to reduce graphene oxide to graphene, wherein graphene was the microwave absorbing medium of the subsequent grafting by microwave irradiation; the dried mixture was microwave irradiated (a power of 500 W) under nitrogen atmosphere for 30 min; the material after the completion of the microwave irradiation was soaked in deionized water for 10 minutes, wherein the deionized water was replaced repeatedly 3 times to ensure the removal of the methyl vinyl silicone oil monomer that did not participate in the grafting reaction and the graphene oxide, followed by placing it in a blast drying oven at 80° C. to be dried; a polypropylene superwetting surface sample grafted with methacrylic acid and methyl vinyl silicone oil side groups was obtained. The data of the water and oil contact angles and the surface graft ratio of the obtained superwetting surface are shown in Table 1.

Example 11

Based on 100 parts by mass of the polypropylene surface sample (the same as in Example 9), methacrylic acid (7 parts by mass) was dissolved in acetone (50 parts by mass) to obtain an acetone solution of methacrylic acid; the acetone solution of methacrylic acid was added onto the polypropylene surface sample under vacuum to be sufficiently contacted and mixed therewith, and then the mixture was dried (dried by a blast drying oven at 80° C.). After drying, the dried mixture of the methacrylic acid and the polypropylene surface sample was microwave irradiated (a power of 500 W) under nitrogen atmosphere for 30 min; the product after the completion of the microwave irradiation was soaked in deionized water for 10 minutes, wherein the deionized water was replaced repeatedly 3 times to ensure the removal of the methacrylic acid monomer that did not participate in the grafting reaction, followed by placing it in a blast drying oven at 80° C. to be dried to obtain a dried methacrylic acid-grafted polypropylene surface sample.

Based on 100 parts by mass of the polypropylene surface sample, methyl vinyl silicone oil (8 parts by mass) was dissolved in ethanol (50 parts by mass) to obtain an ethanol solution of methyl vinyl silicone oil; an aqueous solution of graphene oxide (GO) (3 parts by mass) and ascorbic acid (0.3 part by mass) were dissolved in deionized water (50 parts by mass) to obtain a dispersion of graphene oxide (GO); the ethanol solution of methyl vinyl silicone oil was added onto the above methacrylic acid-grafted polypropylene surface sample under vacuum to be sufficiently contacted and mixed therewith, and then the mixture was dried (dried by a blast drying oven at 80° C.); after drying, the dried mixture of the methyl vinyl silicone oil and the grafted polypropylene surface sample was sufficiently contacted and mixed with the dispersion of graphene oxide (GO), and then the mixture was dried (dried by a blast drying oven at 80° C.), wherein graphene oxide, ascorbic acid and deionized water were mixed to form a dispersion of graphene oxide, after the dispersion of graphene oxide was mixed with the mixture of the methyl vinyl silicone oil and the grafted polypropylene surface sample, upon oven drying at 80° C., ascorbic acid acted as a reducing agent for graphene oxide to reduce graphene oxide to graphene, graphene was the microwave absorbing medium of the subsequent grafting by microwave irradiation; the dried mixture was microwave irradiated (a power of 500 W) under nitrogen atmosphere for 30 min; the material after the completion of the microwave irradiation was soaked in deionized water for 10 minutes, wherein the deionized water was replaced repeatedly 3 times to ensure the removal of the methyl vinyl silicone oil monomer that did not participate in the grafting reaction and the graphene oxide, followed by placing it in a blast drying oven at 80° C. to be dried; a polypropylene superwetting surface sample grafted with methacrylic acid and methyl vinyl silicone oil was obtained. The data of the water and oil contact angles of the obtained superwetting surface are shown in Table 1.

Example 12

Based on 100 parts by mass of the polypropylene surface sample (the same as in Example 9), vinyl trimethoxy silane (9 parts by mass) was dissolved in ethanol (50 parts by mass) to obtain an ethanol solution of vinyl trimethoxy silane; sodium chloride (3 parts by mass) was dissolved in deionized water (50 parts by mass) to obtain an aqueous solution of sodium chloride; the ethanol solution of vinyl trimethoxy silane was added onto the polypropylene surface sample under vacuum to be sufficiently contacted and mixed therewith, and then the mixture was dried (dried by a blast drying oven at 80° C.). After drying, the dried mixture of the vinyl trimethoxy silane and the polypropylene surface sample was sufficiently contacted and mixed with the aqueous solution of sodium chloride, and then the mixture was dried (dried by a blast drying oven at 80° C.); after drying, the dried mixture of the vinyl trimethoxy silane and the polypropylene surface sample was microwave irradiated (a power of 500 W) under nitrogen atmosphere for 30 min; the product after the completion of the microwave irradiation was soaked in deionized water for 10 minutes, wherein the deionized water was replaced repeatedly 3 times to ensure the removal of the vinyl trimethoxy silane monomer that did not participate in the grafting reaction and the sodium chloride, followed by placing it in a blast drying oven at 80° C. to be dried to obtain a dried vinyl trimethoxy silane-grafted polypropylene surface sample.

Based on 100 parts by mass of the polypropylene surface sample, styrene (8 parts by mass) was dissolved in ethanol (50 parts by mass) to obtain an ethanol solution of styrene; an aqueous solution of graphene oxide (GO) (4 parts by mass) and ascorbic acid (0.4 part by mass) were dissolved in deionized water (50 parts by mass) to obtain a dispersion of graphene oxide (GO); the ethanol solution of styrene was added onto the above styrene-grafted polypropylene surface sample under vacuum to be sufficiently contacted and mixed therewith, and then the mixture was dried (dried by a blast drying oven at 80° C.); after drying, the dried powder of the mixture of the styrene and the grafted polypropylene surface sample was sufficiently contacted and mixed with the dispersion of graphene oxide (GO), and then the mixture was dried (dried by a blast drying oven at 80° C.), wherein graphene oxide, ascorbic acid and deionized water were mixed to form a dispersion of graphene oxide, after the dispersion of graphene oxide was mixed with the mixture of the styrene and the grafted polypropylene surface sample, upon oven drying at 80° C., ascorbic acid acted as a reducing agent for graphene oxide to reduce graphene oxide to graphene, wherein graphene was the microwave absorbing medium of the subsequent grafting by microwave irradiation; the dried mixture was microwave irradiated (a power of 500 W) under nitrogen atmosphere for 30 min; the material after the completion of the microwave irradiation was soaked in deionized water for 10 minutes, wherein the deionized water was replaced repeatedly 3 times to ensure the removal of the styrene monomer that did not participate in the grafting reaction and the graphene oxide, followed by placing it in a blast drying oven at 80° C. to be dried; an amphiphilic polypropylene surface sample grafted with vinyl trimethoxy silane and styrene was obtained. The data of the water and oil contact angles and the surface graft ratio of the obtained amphiphilic polypropylene surface are shown in Table 1.

Comparative Example 3

The polypropylene surface sample (the same as in Example 9) was directly tested, and the data of the water and oil contact angles of the polypropylene surface are shown in Table 1.

TABLE 1

| | Water contact angle (°) | White oil contact angle (°) | Surface graft ratio of hydrophilic side groups (%) | Surface graft ratio of lipophilic side groups (%) |
|---|---|---|---|---|
| Example 1 | 0 | 0 | 12.9 | 24.5 |
| Example 2 | 0 | 61 | 13.2 | / |
| Example 3 | 0 | 0 | 14.2 | 29.9 |
| Example 4 | 0 | 59 | 14.3 | / |
| Comparative example 1 | 122 | 45 | / | / |
| Example 5 | 0 | 0 | 12.1 | 28.6 |
| Example 6 | 0 | 41 | 11.9 | / |
| Example 7 | 0 | 0 | 18.2 | 30.6 |
| Example 8 | 0 | 68 | 18.3 | / |
| Comparative example 2 | 125 | 41 | / | / |
| Example 9 | 0 | 0 | 18.6 | 31.6 |
| Example 10 | 0 | 0 | 18.3 | 23.4 |
| Example 11 | 0 | 0 | 21.2 | 22.7 |
| Example 12 | 0 | 0 | 19.8 | 17.5 |
| Comparative example 3 | 131 | 25 | / | / |

It can be seen from Table 1 that the superwetting surface obtained after hydrophilic graft modification or further lipophilic graft modification of the polypropylene surface according to the present invention achieved greatly improved hydrophilicity and lipophilicity compared with the unmodified polypropylene surface, and the superwetting surface achieved super-hydrophilicity, lipophilicity, or even both super-hydrophilicity and super-lipophilicity (super-amphiphilicity) in some cases, indicating that very effective amphiphilic modification of the polypropylene surface was achieved.

Example 13

Based on 100 parts by mass of the polypropylene porous membrane (specification 1: an average pore diameter of 0.8

µm, and a porosity of 80%; surface sample 4), maleic anhydride (5 parts by mass) was dissolved in acetone (50 parts by mass) to obtain an acetone solution of maleic anhydride; sodium hydroxide (5 parts by mass) was dissolved in deionized water (50 parts by mass) to obtain an aqueous solution of sodium hydroxide; the acetone solution of maleic anhydride was added to the polypropylene porous membrane with mechanical stirring under vacuum to be sufficiently mixed therewith, and then the mixture was dried (dried by a blast drying oven at 80° C.). After drying, the dried mixture of the maleic anhydride and the polypropylene porous membrane was microwave irradiated (a power of 700 W) under nitrogen atmosphere for 5 min; the product after the completion of the microwave irradiation was soaked in deionized water for 10 minutes, wherein the deionized water was replaced repeatedly 3 times to ensure the removal of the maleic anhydride monomer that did not participate in the grafting reaction, and then the membrane was placed in a blast drying oven at 80° C. to be dried to obtain a dried maleic anhydride-grafted polypropylene porous membrane; the aqueous solution of sodium hydroxide was sufficiently mixed with the dried maleic anhydride-grafted polypropylene porous membrane with stirring under vacuum; after the completion of the addition of the aqueous solution of sodium hydroxide, further mixing with stirring and reaction continued for 5 minutes. After the reaction was completed, the reaction product was washed with deionized water according to the same washing step as above, and then placed in a blast drying oven at 80° C. to be dried, thereby a sodium maleate-grafted polypropylene porous membrane was obtained.

Based on 100 parts by mass of the polypropylene porous membrane, vinyl silicone oil (5 parts by mass) was dissolved in ethanol (50 parts by mass) to obtain an ethanol solution of vinyl silicone oil; sodium chloride (5 parts by mass) was dissolved in deionized water (50 parts by mass) to obtain an aqueous solution of sodium chloride; the ethanol solution of vinyl silicone oil was added to the above-obtained sodium maleate-grafted polypropylene porous membrane with mechanical stirring under vacuum to be sufficiently mixed therewith, and then the mixture was dried (dried by a blast drying oven at 80° C.); after drying, the dried powder of the mixture of the vinyl silicone oil and the sodium maleate-grafted polypropylene porous membrane was sufficiently mixed with the aqueous solution of sodium chloride, and then the mixture was dried (dried by a blast drying oven at 80° C.); the dried mixture was microwave irradiated (a power of 700 W) under nitrogen atmosphere for 5 min; the material after the completion of the microwave irradiation was soaked in deionized water for 10 minutes, wherein the deionized water was replaced repeatedly 3 times to ensure the removal of the vinyl silicone oil monomer that did not participate in the grafting reaction and the sodium chloride, and then the obtained polypropylene porous membrane was placed in a blast drying oven at 80° C. to be dried to obtain an amphiphilic polypropylene porous membrane grafted with sodium maleate and vinyl silicone oil side groups. The data of the water and oil contact angles, the water and oil fluxes and the surface graft ratio of the obtained amphiphilic polypropylene porous membrane are shown in Table 2.

Example 14

Based on 100 parts by mass of the polypropylene porous membrane (the same as in Example 13), maleic anhydride (5 parts by mass) was dissolved in acetone (50 parts by mass) to obtain an acetone solution of maleic anhydride; sodium hydroxide (5 parts by mass) was dissolved in deionized water (50 parts by mass) to obtain an aqueous solution of sodium hydroxide; the acetone solution of maleic anhydride was added to the polypropylene porous membrane with mechanical stirring under vacuum to be sufficiently mixed therewith, and then the mixture was dried (dried by a blast drying oven at 80° C.). After drying, the dried mixture of the maleic anhydride and the polypropylene porous membrane was microwave irradiated (a power of 700 W) under nitrogen atmosphere for 5 min; the product after the completion of the microwave irradiation was soaked in deionized water for 10 minutes, wherein the deionized water was replaced repeatedly 3 times to ensure the removal of the maleic anhydride monomer that did not participate in the grafting reaction, and then the membrane was placed in a blast drying oven at 80° C. to be dried to obtain a dried maleic anhydride-grafted polypropylene porous membrane; the aqueous solution of sodium hydroxide was added to the dried maleic anhydride-grafted polypropylene porous membrane with stirring under vacuum to be sufficiently mixed therewith; after the completion of the addition of the aqueous solution of sodium hydroxide, further mixing with stirring and reaction continued for 5 minutes. After the reaction was completed, the reaction product was washed with deionized water according to the same washing step as above, and then placed in a blast drying oven at 80° C. to be dried, thereby an amphiphilic polypropylene porous membrane grafted with sodium maleate side groups was obtained. The data of the water and oil contact angles, the water and oil fluxes and the surface graft ratio of the obtained amphiphilic polypropylene porous membrane are shown in Table 2.

Example 15

Based on 100 parts by mass of the polypropylene porous membrane (the same as in Example 13), vinyl silicone oil (10 parts by mass) was dissolved in ethanol (50 parts by mass) to obtain an ethanol solution of vinyl silicone oil; sodium chloride (5 parts by mass) was dissolved in deionized water (50 parts by mass) to obtain an aqueous solution of sodium chloride; the ethanol solution of vinyl silicone oil was added to the polypropylene porous membrane with mechanical stirring under vacuum to be sufficiently mixed therewith, and then the mixture was dried (dried by a blast drying oven at 80° C.); after drying, the dried powder of the mixture of the vinyl silicone oil and the polypropylene porous membrane was sufficiently mixed with the aqueous solution of sodium chloride, and then the mixture was dried (dried by a blast drying oven at 80° C.); the dried mixture was microwave irradiated (a power of 1000 W) under nitrogen atmosphere for 3 min; the material after the completion of the microwave irradiation was soaked in deionized water for 10 minutes, wherein the deionized water was replaced repeatedly 3 times to ensure the removal of the vinyl silicone oil monomer that did not participate in the grafting reaction and the sodium chloride, and then the membrane was placed in a blast drying oven at 80° C. to be dried, thereby an amphiphilic polypropylene porous membrane grafted with vinyl silicone oil side groups was obtained.

Based on 100 parts by mass of the polypropylene porous membrane, acrylic acid (10 parts by mass) was dissolved in acetone (50 parts by mass) to obtain an acetone solution of acrylic acid; potassium hydroxide (8 parts by mass) was dissolved in deionized water (50 parts by mass) to obtain an aqueous solution of potassium hydroxide; the acetone solution of acrylic acid was added to the above polypropylene porous membrane grafted with vinyl silicone oil side groups with mechanical stirring under vacuum to be sufficiently mixed therewith, and then the mixture was dried (dried by a blast drying oven at 80° C.). After drying, the dried mixture of the acrylic acid and the grafted polypropylene porous membrane was microwave irradiated (a power of 1000 W) under nitrogen atmosphere for 3 min; the product after the completion of the microwave irradiation was soaked in deionized water for 10 minutes, wherein the deionized water was replaced repeatedly 3 times to ensure the removal of the acrylic acid monomer that did not participate in the grafting reaction, and then the membrane was placed in a blast drying oven at 80° C. to be dried to obtain a dried polypropylene porous membrane grafted with acrylic acid and vinyl silicone oil; the aqueous solution of potassium hydroxide was added to the dried polypropylene porous membrane grafted with acrylic acid and vinyl silicone oil with stirring under vacuum to be sufficiently mixed therewith; after the completion of the addition of the aqueous solution of potassium hydroxide, further mixing with stirring and reaction continued for 5 minutes. After the reaction was completed, the reaction product was washed with deionized water according to the same washing step as above, and then placed in a blast drying oven at 80° C. to be dried, thereby an amphiphilic polypropylene porous membrane grafted with potassium acrylate and vinyl silicone oil side groups was obtained. The data of the water and oil contact angles, the water and oil fluxes and the surface graft ratio of the obtained amphiphilic polypropylene porous membrane are shown in Table 2.

Example 16

Based on 100 parts by mass of the polypropylene porous membrane (the same as in Example 13), acrylic acid (10 parts by mass) was dissolved in acetone (50 parts by mass) to obtain an acetone solution of acrylic acid; potassium hydroxide (8 parts by mass) was dissolved in deionized water (50 parts by mass) to obtain an aqueous solution of potassium hydroxide; the acetone solution of acrylic acid was added to the polypropylene porous membrane with mechanical stirring under vacuum to be sufficiently mixed therewith, and then the mixture was dried (dried by a blast drying oven at 80° C.). After drying, the dried mixture of the acrylic acid and the polypropylene porous membrane was microwave irradiated (a power of 1000 W) under nitrogen atmosphere for 3 min; the product after the completion of the microwave irradiation was soaked in deionized water for 10 minutes, wherein the deionized water was replaced repeatedly 3 times to ensure the removal of the acrylic acid monomer that did not participate in the grafting reaction, and then the membrane was placed in a blast drying oven at 80° C. to be dried to obtain a dried acrylic acid-grafted polypropylene porous membrane; the aqueous solution of potassium hydroxide was added to the dried acrylic acid-grafted polypropylene porous membrane with stirring under vacuum to be sufficiently mixed therewith; after the completion of the addition of the aqueous solution of potassium hydroxide, further mixing with stirring and reaction continued for 5 minutes. After the reaction was completed, the reaction product was washed with deionized water according to the same washing step as above, and then placed in a blast drying oven at 80° C. to be dried, thereby an amphiphilic polypropylene porous membrane grafted with potassium acrylate side groups was obtained. The data of the water and oil contact angles, the water and oil fluxes and the surface graft ratio of the obtained amphiphilic polypropylene porous membrane are shown in Table 2.

Comparative Example 4

The polypropylene porous membrane (the same as in Example 13) was directly tested, and the data of the water and oil contact angles and the water and oil fluxes of the polypropylene porous membrane are shown in Table 2.

Example 17

Based on 100 parts by mass of the polypropylene porous membrane (specification 2: an average pore diameter of 0.65 μm, and a porosity of 70%; surface sample 5), 2-acrylamido-2-methylpropanesulfonic acid (10 parts by mass) was dissolved in acetone (50 parts by mass) to obtain an acetone solution of 2-acrylamido-2-methylpropanesulfonic acid; potassium hydroxide (8 parts by mass) was dissolved in deionized water (50 parts by mass) to obtain an aqueous solution of potassium hydroxide; the acetone solution of 2-acrylamido-2-methylpropanesulfonic acid was added to the polypropylene porous membrane with mechanical stirring under vacuum to be sufficiently mixed therewith, and then the mixture was dried (dried by a blast drying oven at 80° C.). After drying, the dried mixture of the 2-acrylamido-2-methylpropanesulfonic acid and the polypropylene porous membrane was microwave irradiated (a power of 1000 W) under nitrogen atmosphere for 3 min; the product after the completion of the microwave irradiation was soaked in deionized water for 10 minutes, wherein the deionized water was replaced repeatedly 3 times to ensure the removal of the 2-acrylamido-2-methylpropanesulfonic acid monomer that did not participate in the grafting reaction, and then the membrane was placed in a blast drying oven at 80° C. to be dried to obtain a dried 2-acrylamido-2-methylpropanesulfonic acid-grafted polypropylene porous membrane; the aqueous solution of potassium hydroxide was sufficiently mixed with the dried 2-acrylamido-2-methylpropanesulfonic acid-grafted polypropylene porous membrane with stirring under vacuum;

after the completion of the addition of the aqueous solution of potassium hydroxide, further mixing with stirring and reaction continued for 5 minutes. After the reaction was completed, the reaction product was washed with deionized water according to the same washing step as above, and then placed in a blast drying oven at 80° C. to be dried, thereby a potassium 2-acrylamido-2-methylpropanesulfonate-grafted polypropylene porous membrane was obtained.

Based on 100 parts by mass of the polypropylene porous membrane, vinyl hydrogen-containing silicone oil (10 parts by mass) was dissolved in ethanol (50 parts by mass) to obtain an ethanol solution of vinyl hydrogen-containing silicone oil; sodium chloride (5 parts by mass) was dissolved in deionized water (50 parts by mass) to obtain an aqueous solution of sodium chloride; the ethanol solution of vinyl hydrogen-containing silicone oil was added to the above potassium 2-acrylamido-2-methylpropanesulfonate-grafted polypropylene porous membrane with mechanical stirring under vacuum to be sufficiently mixed therewith, and then the mixture was dried (dried by a blast drying oven at 80° C.); after drying, the dried powder of the mixture of the vinyl hydrogen-containing silicone oil and the polypropylene porous membrane was sufficiently mixed with the aqueous solution of sodium chloride, and then the mixture was dried (dried by a blast drying oven at 80° C.); the dried mixture was microwave irradiated (a power of 1000 W) under nitrogen atmosphere for 3 min; the material after the completion of the microwave irradiation was soaked in deionized water for 10 minutes, wherein the deionized water was replaced repeatedly 3 times to ensure the removal of the vinyl hydrogen-containing silicone oil monomer that did not participate in the grafting reaction and the sodium chloride, and then the membrane was placed in a blast drying oven at 80° C. to be dried, thereby an amphiphilic polypropylene porous membrane grafted with sodium 2-acrylamido-2-methylpropanesulfonate and vinyl hydrogen-containing silicone oil side groups was obtained. The data of the water and oil contact angles, the water and oil fluxes and the surface graft ratio of the obtained amphiphilic polypropylene porous membrane are shown in Table 2.

Example 18

Based on 100 parts by mass of the polypropylene porous membrane (the same as in Example 17), 2-acrylamido-2-methylpropanesulfonic acid (10 parts by mass) was dissolved in acetone (50 parts by mass) to obtain an acetone solution of 2-acrylamido-2-methylpropanesulfonic acid; potassium hydroxide (8 parts by mass) was dissolved in deionized water (50 parts by mass) to obtain an aqueous solution of potassium hydroxide; the acetone solution of 2-acrylamido-2-methylpropanesulfonic acid was added to the polypropylene porous membrane with mechanical stirring under vacuum to be sufficiently mixed therewith, and then the mixture was dried (dried by a blast drying oven at 80° C.). After drying, the dried mixture of the 2-acrylamido-2-methylpropanesulfonic acid and the polypropylene porous membrane was microwave irradiated (a power of 1000 W) under nitrogen atmosphere for 3 min; the product after the completion of the microwave irradiation was soaked in deionized water for 10 minutes, wherein the deionized water was replaced repeatedly 3 times to ensure the removal of the 2-acrylamido-2-methylpropanesulfonic acid monomer that did not participate in the grafting reaction, and then the membrane was placed in a blast drying oven at 80° C. to be dried to obtain a dried 2-acrylamido-2-methylpropanesulfonic acid-grafted polypropylene porous membrane; the aqueous solution of potassium hydroxide was added to the dried 2-acrylamido-2-methylpropanesulfonic acid-grafted polypropylene porous membrane with stirring under vacuum to be sufficiently mixed therewith; after the completion of the addition of the aqueous solution of potassium hydroxide, further mixing with stirring and reaction continued for 5 minutes. After the reaction was completed, the reaction product was washed with deionized water according to the same washing step as above, and then placed in a blast drying oven at 80° C. to be dried, thereby an amphiphilic polypropylene porous membrane grafted with potassium 2-acrylamido-2-methylpropanesulfonate side groups was obtained. The data of the water and oil contact angles, the water and oil fluxes and the surface graft ratio of the obtained amphiphilic polypropylene porous membrane are shown in Table 2.

Example 19

Based on 100 parts by mass of the polypropylene porous membrane (the same as in Example 17), methacrylic acid (8 parts by mass) was dissolved in acetone (50 parts by mass) to obtain an acetone solution of methacrylic acid; calcium hydroxide (6 parts by mass) was dissolved in deionized water (50 parts by mass) to obtain an aqueous solution of calcium hydroxide; the acetone solution of methacrylic acid was added to the polypropylene porous membrane with mechanical stirring under vacuum to be sufficiently mixed therewith, and then the mixture was dried (dried by a blast drying oven at 80° C.). After drying, the dried mixture of the methacrylic acid and the polypropylene porous membrane was microwave irradiated (a power of 2000 W) under nitrogen atmosphere for 1 min; the product after the completion of the microwave irradiation was soaked in deionized water for 10 minutes, wherein the deionized water was replaced repeatedly 3 times to ensure the removal of the methacrylic acid monomer that did not participate in the grafting reaction, and then the membrane was placed in a blast drying oven at 80° C. to be dried to obtain a dried methacrylic acid-grafted polypropylene porous membrane; the aqueous solution of calcium hydroxide was added to the dried methacrylic acid-grafted polypropylene porous membrane with stirring under vacuum to be sufficiently mixed therewith; after the completion of the addition of the aqueous solution of calcium hydroxide, further mixing with stirring and reaction continued for 5 minutes. After the reaction was completed, the reaction product was washed with deionized water according to the same washing step as above, and then placed in a blast drying oven at 80° C. to be dried, thereby a calcium methacrylate-grafted polypropylene porous membrane was obtained.

Based on 100 parts by mass of the polypropylene porous membrane, divinyl silicone oil (10 parts by mass) was dissolved in ethanol (50 parts by mass) to obtain an ethanol solution of divinyl silicone oil; sodium chloride (5 parts by mass) was dissolved in deionized water (50 parts by mass) to obtain an aqueous solution of sodium chloride; the ethanol solution of divinyl silicone oil was added to the above calcium methacrylate grafted-polypropylene porous membrane with mechanical stirring under vacuum to be sufficiently mixed therewith, and then the mixture was dried (dried by a blast drying oven at 80° C.); after drying, the dried mixture of the divinyl silicone oil and the grafted polypropylene porous membrane was sufficiently mixed with the aqueous solution of sodium chloride, and then the mixture was dried (dried by a blast drying oven at 80° C.); the dried mixture was microwave irradiated (a power of 2000 W) under nitrogen atmosphere for 1 min; the material after the completion of the microwave irradiation was soaked in deionized water for 10 minutes, wherein the deionized water was replaced repeatedly 3 times to ensure the removal of the divinyl silicone oil monomer that did not participate in the grafting reaction and the sodium chloride, and then the membrane was placed in a blast drying oven at 80° C. to be dried, thereby an amphiphilic polypropylene porous membrane grafted with calcium methacrylate and divinyl silicone oil side groups was obtained. The data of the water and oil contact angles, the water and oil fluxes and the surface graft ratio of the obtained amphiphilic polypropylene porous membrane are shown in Table 2.

Example 20

Based on 100 parts by mass of the polypropylene porous membrane (the same as in Example 17), methacrylic acid (8 parts by mass) was dissolved in acetone (50 parts by mass) to obtain an acetone solution of methacrylic acid; calcium hydroxide (6 parts by mass) was dissolved in deionized water (50 parts by mass) to obtain an aqueous solution of calcium hydroxide; the acetone solution of methacrylic acid was added to the polypropylene porous membrane with mechanical stirring under vacuum to be sufficiently mixed therewith, and then the mixture was dried (dried by a blast drying oven at 80° C.). After drying, the dried mixture of the methacrylic acid and the polypropylene porous membrane was microwave irradiated (a power of 2000 W) under nitrogen atmosphere for 1 min; the product after the completion of the microwave irradiation was soaked in deionized water for 10 minutes, wherein the deionized water was replaced repeatedly 3 times to ensure the removal of the methacrylic acid monomer that did not participate in the grafting reaction, and then the membrane was placed in a blast drying oven at 80° C. to be dried to obtain a dried methacrylic acid-grafted polypropylene porous membrane; the aqueous solution of calcium hydroxide was added to the dried methacrylic acid-grafted polypropylene porous membrane with stirring under vacuum to be sufficiently mixed therewith; after the completion of the addition of the aqueous solution of calcium hydroxide, further mixing with stirring and reaction continued for 5 minutes. After the reaction was completed, the reaction product was washed with deionized water according to the same washing step as above, and then placed in a blast drying oven at 80° C. to be dried, thereby an amphiphilic polypropylene porous membrane grafted with calcium methacrylate side groups was obtained. The data of the water and oil contact angles, the water and oil fluxes and the surface graft ratio of the obtained amphiphilic polypropylene porous membrane are shown in Table 2.

Example 21

Based on 100 parts by mass of the polypropylene porous membrane (the same as in Example 17), methacrylic acid (8 parts by mass) was dissolved in acetone (50 parts by mass) to obtain an acetone solution of methacrylic acid; the acetone solution of methacrylic acid was added to the polypropylene porous membrane with mechanical stirring under vacuum to be sufficiently mixed therewith, and then the mixture was dried (dried by a blast drying oven at 80° C.). After drying, the dried mixture of the methacrylic acid and the polypropylene porous membrane was microwave irradiated (a power of 500 W) under nitrogen atmosphere for 30 min; the product after the completion of the microwave irradiation was soaked in deionized water for 10 minutes, wherein the deionized water was replaced repeatedly 3 times to ensure the removal of the methacrylic acid monomer that did not participate in the grafting reaction, and then the membrane was placed in a blast drying oven at 80° C. to be dried to obtain a dried methacrylic acid-grafted polypropylene porous membrane.

Based on 100 parts by mass of the polypropylene porous membrane, divinyl silicone oil (10 parts by mass) was dissolved in ethanol (50 parts by mass) to obtain an ethanol solution of divinyl silicone oil; sodium chloride (5 parts by mass) was dissolved in deionized water (50 parts by mass) to obtain an aqueous solution of sodium chloride; the ethanol solution of divinyl silicone oil was added to the above methacrylic acid-grafted polypropylene porous membrane with mechanical stirring under vacuum to be sufficiently mixed therewith, and then the mixture was dried (dried by a blast drying oven at 80° C.); after drying, the dried mixture of the divinyl silicone oil and the grafted polypropylene porous membrane was sufficiently mixed with the aqueous solution of sodium chloride, and then the mixture was dried (dried by a blast drying oven at 80° C.); the dried mixture was microwave irradiated (a power of 500 W) under nitrogen atmosphere for 30 min; the material after the completion of the microwave irradiation was soaked in deionized water for 10 minutes, wherein the deionized water was replaced repeatedly 3 times to ensure the removal of the divinyl silicone oil monomer that did not participate in the grafting reaction and the sodium chloride, and then the membrane was placed in a blast drying oven at 80° C. to be dried, thereby an amphiphilic polypropylene porous membrane grafted with methacrylic acid and divinyl silicone oil side groups was obtained. The data of the water and oil contact angles, the water and oil fluxes and the surface graft ratio of the obtained amphiphilic polypropylene porous membrane are shown in Table 2.

Example 22

Based on 100 parts by mass of the polypropylene porous membrane (the same as in Example 17), methacrylic acid (8 parts by mass) was dissolved in acetone (50 parts by mass) to obtain an acetone solution of methacrylic acid; calcium hydroxide (5 parts by mass) was dissolved in deionized water (50 parts by mass) to obtain an aqueous solution of calcium hydroxide; the acetone solution of methacrylic acid was added to the polypropylene porous membrane with mechanical stirring under vacuum to be sufficiently mixed therewith, and then the mixture was dried (dried by a blast drying oven at 80° C.). After drying, the dried mixture of the methacrylic acid and the polypropylene porous membrane was microwave irradiated (a power of 500 W) under nitrogen atmosphere for 30 min; the product after the completion of the microwave irradiation was soaked in deionized water for 10 minutes, wherein the deionized water was replaced repeatedly 3 times to ensure the removal of the methacrylic acid monomer that did not participate in the grafting reaction, and then the membrane was placed in a blast drying oven at 80° C. to be dried to obtain a dried methacrylic acid-grafted polypropylene porous membrane. The aqueous solution of calcium hydroxide was added to the dried methacrylic acid-grafted polypropylene porous membrane with stirring under vacuum to be sufficiently mixed therewith; after the completion of the addition of the aqueous solution of calcium hydroxide, further mixing with stirring and reaction continued for 5 minutes. After the reaction was completed, the reaction product was washed with deionized water according to the same washing step as above, and then placed in a blast drying oven at 80° C. to be dried, thereby a calcium methacrylate-grafted polypropylene porous membrane was obtained.

Based on 100 parts by mass of the polypropylene porous membrane, methyl vinyl silicone oil (10 parts by mass) was dissolved in ethanol (50 parts by mass) to obtain an ethanol solution of methyl vinyl silicone oil; an aqueous solution of graphene oxide (GO) (5 parts by mass) and ascorbic acid (0.5 part by mass) were dissolved in deionized water (50 parts by mass) to obtain a dispersion of graphene oxide (GO); the ethanol solution of methyl vinyl silicone oil was added to the above calcium methacrylate-grafted polypropylene porous membrane with mechanical stirring under vacuum to be sufficiently mixed therewith, and then the mixture was dried (dried by a blast drying oven at 80° C.); after drying, the dried mixture of the methyl vinyl silicone oil and the grafted polypropylene porous membrane was sufficiently mixed with the dispersion of graphene oxide (GO), and then the mixture was dried (dried by a blast drying oven at 80° C.), wherein graphene oxide, ascorbic acid and deionized water were mixed to form a dispersion of graphene oxide; after the dispersion of graphene oxide was mixed with the mixture of the methyl vinyl silicone oil and the grafted polypropylene porous membrane, upon oven drying at 80° C., ascorbic acid acted as a reducing agent for graphene oxide to reduce graphene oxide to graphene, wherein graphene was the microwave absorbing medium of the subsequent grafting by microwave irradiation; the above dried mixture was microwave irradiated (a power of 500 W) under nitrogen atmosphere for 30 min; the material after the completion of the microwave irradiation was soaked in deionized water for 10 minutes, wherein the deionized water was replaced repeatedly 3 times to ensure the removal of the methyl vinyl silicone oil monomer that did not participate in the grafting reaction and the graphene oxide, and then the membrane was placed in a blast drying oven at 80° C. to be dried; an amphiphilic polypropylene porous membrane grafted with calcium methacrylate and methyl vinyl silicone oil was obtained. The data of the water and oil contact angles, the water and oil fluxes and the surface graft ratio of the obtained amphiphilic polypropylene porous membrane are shown in Table 2.

Example 23

Based on 100 parts by mass of the polypropylene porous membrane (the same as in Example 17), vinyl trimethoxy silane (10 parts by mass) was dissolved in ethanol (50 parts by mass) to obtain an ethanol solution of vinyl trimethoxy silane; sodium chloride (5 parts by mass) was dissolved in deionized water (50 parts by mass) to obtain an aqueous solution of sodium chloride; the ethanol solution of vinyl trimethoxy silane was added to the polypropylene porous membrane with mechanical stirring under vacuum to be sufficiently mixed therewith, and then the mixture was dried (dried by a blast drying oven at 80° C.). After drying, the dried mixture of the vinyl trimethoxy silane and the polypropylene porous membrane was sufficiently mixed with the aqueous solution of sodium chloride, and then the mixture was dried (dried by a blast drying oven at 80° C.); after drying, the dried mixture of the vinyl trimethoxy silane and the polypropylene porous membrane was microwave irradiated (a power of 500 W) under nitrogen atmosphere for 30 min; the product after the completion of the microwave irradiation was soaked in deionized water for 10 minutes, wherein the deionized water was replaced repeatedly 3 times to ensure the removal of the vinyl trimethoxy silane monomer that did not participate in the grafting reaction and the sodium chloride, and then the membrane was placed in a blast drying oven at 80° C. to be dried to obtain a dried vinyl trimethoxy silane-grafted polypropylene porous membrane.

Based on 100 parts by mass of the polypropylene porous membrane, styrene (10 parts by mass) was dissolved in ethanol (50 parts by mass) to obtain an ethanol solution of styrene; an aqueous solution of graphene oxide (GO) (5 parts by mass) and ascorbic acid (0.5 part by mass) were dissolved in deionized water (50 parts by mass) to obtain a dispersion of graphene oxide (GO); the ethanol solution of styrene was added to the above styrene-grafted polypropylene porous membrane with mechanical stirring under vacuum to be sufficiently mixed therewith, and then the mixture was dried (dried by a blast drying oven at 80° C.); after drying, the dried powder of the mixture of the styrene and the grafted polypropylene porous membrane was sufficiently mixed with the dispersion of graphene oxide (GO), and then the mixture was dried (dried by a blast drying oven at 80° C.), wherein graphene oxide, ascorbic acid and deionized water were mixed to form a dispersion of graphene oxide; after the dispersion of graphene oxide was mixed with the mixture of the styrene and the grafted polypropylene porous membrane, upon oven drying at 80° C., ascorbic acid acted as a reducing agent for graphene oxide to reduce graphene oxide to graphene, wherein graphene was the microwave absorbing medium of the subsequent grafting by microwave irradiation; the dried mixture was microwave irradiated (a power of 500 W) under nitrogen atmosphere for 30 min; the material after the completion of the microwave irradiation was soaked in deionized water for 10 minutes, wherein the deionized water was replaced repeatedly 3 times to ensure the removal of the styrene monomer that did not participate in the grafting reaction and the graphene oxide, and then the membrane was placed in a blast drying oven at 80° C. to be dried; an amphiphilic polypropylene porous membrane grafted with vinyl trimethoxy silane and styrene was obtained. The data of the water and oil contact angles, the water and oil fluxes and the surface graft ratio of the obtained amphiphilic polypropylene porous membrane are shown in Table 2.

Comparative Example 5

The polypropylene porous membrane (the same as in Example 17) was directly tested, and the data of the water and oil contact angles and the water and oil fluxes of the polypropylene porous membrane are shown in Table 2.

TABLE 2

| | Water contact angle (°) | Peanut oil contact angle (°) | Water flux (g/cm²h) | Peanut oil flux (g/cm²h) | Trichloromethane flux (g/cm²h) | Surface graft ratio of hydrophilic side groups (%) | Surface graft ratio of lipophilic side groups (%) |
|---|---|---|---|---|---|---|---|
| Example 13 | 0 | 0 | 890 | 15 | 603 | 13.5 | 25.2 |
| Example 14 | 0 | 68 | 1000 | 2 | 198 | 13.4 | / |
| Example 15 | 0 | 0 | 965 | 14 | 596 | 14.9 | 31.4 |
| Example 16 | 0 | 61 | 1105 | 3 | 180 | 14.9 | / |
| Comparative example 4 | 115.5 | 65 | 0 | 2 | 160 | / | / |
| Example 17 | 0 | 0 | 1206 | 12 | 612 | 12.5 | 24.6 |
| Example 18 | 0 | 45 | 1235 | 2 | 201 | 12.4 | / |
| Example 19 | 0 | 0 | 965 | 13 | 595 | 18.4 | 29.8 |
| Example 20 | 0 | 63 | 1001 | 1 | 213 | 18.2 | / |
| Example 21 | 8 | 0 | 856 | 13 | 560 | 19.6 | 32.6 |
| Example 22 | 0 | 0 | 912 | 14 | 580 | 18.9 | 21.8 |
| Example 23 | 0 | 0 | 843 | 14 | 596 | 17.5 | 18.9 |
| Comparative example 5 | 120.1 | 69 | 0 | 2 | 165 | / | / |

It can be seen from Table 2 that the superwetting surface obtained after hydrophilic graft modification or further lipophilic graft modification of the polypropylene porous membrane according to the present invention achieved great increase in both the water and oil fluxes compared with the unmodified polypropylene porous membrane, and the modified polypropylene porous membrane achieved super-hydrophilicity, lipophilicity, or even both super-hydrophilicity and super-lipophilicity in some cases, indicating that very effective amphiphilic modification of the polypropylene porous membrane was achieved.

The invention claimed is:

1. A superwetting surface made of a polypropylene material having a micro-nano structure, wherein the polypropylene material comprises a hydrophilic side group and a lipophilic side group grafted thereon, wherein the superwetting surface is at least super-hydrophilic and the water contact angle of the superwetting surface is less than or equal to 10°, and the superwetting surface does not contain an initiator residue, wherein the hydrophilic side group comprises a unit derived from one or more monomers containing a carbon-carbon double bond and containing one or more heteroatoms selected from the group consisting of oxygen, sulfur, nitrogen, silicon, and halogens, and wherein the lipophilic side group is selected from the group consisting of side groups formed by vinyl silicone oil, side groups formed by styrene, and combinations thereof.

2. The superwetting surface according to claim 1, wherein the water contact angle of the superwetting surface is less than or equal to 5°.

3. The superwetting surface according to claim 2, wherein the water contact angle of the superwetting surface is about 0°.

4. The superwetting surface according to claim 1, wherein a feature size of the micro-nano structure of the polypropylene material as the grafting base is 1 nm-100 μm.

5. The superwetting surface according to claim 4, wherein the micro-nano structure of the polypropylene material is formed by subjecting the polypropylene material to a thermally-induced phase separation process, a photolithography technology, a femtosecond laser processing technology, a plasma etching technology, an electrospinning method, nano-imprinting, nano-casting, an ultra-precision micro-milling technology or by an electric arc.

6. The superwetting surface according to claim 4, wherein the polypropylene material as the grafting base is a polypropylene porous membrane, a polypropylene flat membrane, or a polypropylene hollow fiber microporous membrane.

7. The superwetting surface according to claim 6, wherein the polypropylene porous membrane has an average pore diameter of less than 100 μm.

8. The superwetting surface according to claim 6, wherein the polypropylene porous membrane has a porosity of 50-90%, as measured using the mercury intrusion porosimetry.

9. The superwetting surface according to claim 1, wherein the one or more monomers containing a heteroatom comprises at least one selected from the group consisting of vinyl silanes, and organic acids and derivatives thereof, wherein the derivatives are anhydrides, esters, or salts.

10. The superwetting surface according to claim 9, wherein the organic acids and derivatives thereof are selected from the group consisting of maleic anhydride and derivatives thereof, (meth)acrylic acid and derivatives thereof, vinyl acetate, alkenyl sulfonic acid and derivatives thereof, vinyl benzoic acid and derivatives thereof, itaconic acid and derivatives thereof, oleic acid and derivatives thereof, arachidonic acid and derivatives thereof, and combinations thereof.

11. The superwetting surface according to claim 9, wherein the vinyl silane is one or more compounds of Formula (1):

$$CH_2{=}CH{-}(CH_2)_nSiX_3 \hspace{3cm} \text{Formula (1),}$$

wherein n=0 to 3, each X is the same or different and independently represents a chloro group, a methoxy group, an ethoxy group, or an acetoxy group.

12. The superwetting surface according to claim 1, wherein the vinyl silicone oil is selected from the group consisting of methyl vinyl silicone oil, vinyl hydrogen-containing silicone oil, divinyl silicone oil, and combinations thereof.

13. The superwetting surface as claimed in claim 12, wherein the oil contact angle of the superwetting surface is less than 90°.

14. The superwetting surface as claimed in claim 12, wherein the oil contact angle of the superwetting surface is less than or equal to 10°.

15. The superwetting surface as claimed in claim 12, wherein the oil contact angle of the superwetting surface is about 0°.

16. The superwetting surface according to claim 1, wherein the superwetting surface is prepared by subjecting monomers for forming the hydrophilic side group and the lipophilic side group and a polypropylene material having a micro-nano structure as the grafting base in the absence of an initiator to microwave irradiation to effectuate a grafting reaction.

17. The superwetting surface according to claim 16, wherein the monomers are mixed with an inorganic microwave absorbing medium.

18. The superwetting surface according to claim 16, wherein the monomer is selected from the group consisting of organic acids or anhydrides thereof or esters thereof and combinations thereof, and the method further comprises the step of reacting the product obtained after the grafting reaction with a base.

19. The superwetting surface according to claim 1, wherein the hydrophilic side group comprises or consists of a unit derived from a salt of an organic acid.

20. An article, constituted by the superwetting surface according to claim 1, or comprising the superwetting surface according to claim 1, wherein the article is a film, sheet, plate, or molded article.

21. Bonding, spraying, oil-water separation or water treatment method using the article according to claim 20, wherein said method is bonding of plastic articles, spraying of the outer packaging of food bags, or spraying of the automobile bumper.

22. A method for preparing the superwetting surface according to claim 1, comprising: subjecting-monomers for forming-side groups and a polypropylene material having a micro-nano structure as grafting base to a grafting reaction by microwave irradiation without an initiator.

23. The method according to claim 22, wherein the method includes any one of the following approaches 1) to 4):

1) contacting and mixing the polypropylene material with a monomer for forming the hydrophilic side group and a monomer for lipophilic side group, wherein an inorganic microwave absorbing medium is optionally added; and then subjecting the resulting mixture to microwave irradiation grafting without the addition of an initiator;

2) contacting and mixing the polypropylene material with the monomer for forming the hydrophilic side group, wherein an inorganic microwave absorbing medium is optionally added; then subjecting the resulting mixture to microwave irradiation grafting without the addition of an initiator; and then mixing the obtained grafted product with the monomer for forming the lipophilic side group and an inorganic microwave absorbing medium, and performing microwave irradiation grafting without the addition of an initiator;

3) contacting and mixing the polypropylene material with the monomer for forming the lipophilic side group and an inorganic microwave absorbing medium, then subjecting the resulting mixture to microwave irradiation grafting without the addition of an initiator; then mixing the obtained grafted product with the monomer for forming the hydrophilic side group under the condition of optionally adding an inorganic microwave absorbing medium, and performing microwave irradiation grafting without the addition of an initiator;

4) in any one of the above 1)-3), when the monomer for forming the hydrophilic side group is at least one of an organic acid or an anhydride or ester thereof, further comprising the step of contacting and mixing the polypropylene material grafted with at least one side group of an organic acid or an anhydride or ester thereof with a base.

24. The method according to claim 23, wherein the amount of the monomer for forming the hydrophilic side group is 0.1-10% by weight, based on the amount of the polypropylene material.

25. The method according to claim 23, wherein the amount of the monomer for forming the lipophilic side group is 0.1-30% by weight, based on the amount of the polypropylene material.

26. The method according to claim 23, wherein the base is selected from the group consisting of metal hydroxides and ammonia water, wherein the metal hydroxide is selected from the group consisting of sodium hydroxide, potassium hydroxide, barium hydroxide, lithium hydroxide, strontium hydroxide, calcium hydroxide, iron hydroxide, ferrous hydroxide, zinc hydroxide, magnesium hydroxide, cobalt hydroxide, gold hydroxide, aluminum hydroxide, copper hydroxide, beryllium hydroxide, rare earth hydroxide and combinations thereof.

27. The method according to claim 23, wherein at least one of the above mixing processes is carried out under vacuum.

28. The method according to claim 22, wherein an inorganic microwave absorbing medium is added, wherein the inorganic microwave absorbing medium is selected from the group consisting of metal hydroxides, metal salts, metal oxides, graphite materials, ferroelectric materials, electrolytic stone, chalcopyrite, and combinations thereof.

29. The method according to claim 28, wherein the inorganic microwave absorbing medium is selected from the group consisting of potassium hydroxide, barium hydroxide, sodium hydroxide, lithium hydroxide, strontium hydroxide, calcium hydroxide, iron hydroxide, ferrous hydroxide, zinc hydroxide, magnesium hydroxide, cobalt hydroxide, gold hydroxide, aluminum hydroxide, copper hydroxide, beryllium hydroxide, rare earth hydroxide and combinations thereof;

ammonium nitrate, potassium nitrate, sodium nitrate, barium nitrate, calcium nitrate, magnesium nitrate, aluminum nitrate, manganese nitrate, zinc nitrate, ferric nitrate, ferrous nitrate, copper nitrate, silver nitrate, ammonium chloride, potassium chloride, sodium chloride, barium chloride, calcium chloride, magnesium chloride, aluminum chloride, manganese chloride, zinc chloride, ferric chloride, ferrous chloride, copper chloride, ammonium sulfate, potassium sulfate, sodium sulfate, calcium sulfate, magnesium sulfate, aluminum sulfate, manganese sulfate, zinc sulfate, iron sulfate, ferrous sulfate, copper sulfate, silver sulfate, ammonium carbonate, potassium carbonate, sodium carbonate, magnesium carbonate, calcium carbonate, barium carbonate, potassium dihydrogen phosphate, barium titanate, strontium titanate, copper calcium titanate and combinations thereof;

ferric oxide, ferroferric oxide and combinations thereof; and carbon black, graphite powder, graphene, reduction product of graphene oxide, carbon nanotubes, activated carbon and combinations thereof.

30. The method according to claim 28, wherein the amount of the inorganic microwave absorbing medium in single usage is 0.1-10% by weight of the amount of the polypropylene material.

* * * * *